(12) United States Patent
Xia

(10) Patent No.: US 8,176,082 B2
(45) Date of Patent: May 8, 2012

(54) SEARCH ENGINE AND INDEXING TECHNIQUES

(75) Inventor: Xiongwu Xia, Dayton, NJ (US)

(73) Assignee: Local.com Corporation, Irvine, CA (US)

( * ) Notice: Subject to any disclaimer, the term of this patent is extended or adjusted under 35 U.S.C. 154(b) by 0 days.

(21) Appl. No.: 12/888,149

(22) Filed: Sep. 22, 2010

(65) Prior Publication Data

US 2011/0016106 A1 Jan. 20, 2011

Related U.S. Application Data

(63) Continuation of application No. 11/761,082, filed on Jun. 11, 2007, now Pat. No. 7,822,705, which is a continuation of application No. 11/032,385, filed on Jan. 10, 2005, now Pat. No. 7,231,405.

(60) Provisional application No. 60/568,975, filed on May 8, 2004.

(51) Int. Cl.
*G06F 7/00* (2006.01)
(52) U.S. Cl. ......... 707/791; 707/802; 707/822; 707/828
(58) Field of Classification Search ........... 707/600–831
See application file for complete search history.

(56) References Cited

U.S. PATENT DOCUMENTS

| | | | |
|---|---|---|---|
| 6,701,307 B2 | 3/2004 | Himmelstein et al. | |
| 6,757,740 B1 | 6/2004 | Parekh et al. | |
| 7,072,963 B2 | 7/2006 | Anderson et al. | |
| 7,233,942 B2 | 6/2007 | Nye | |
| 2001/0020235 A1 | 9/2001 | Game | |
| 2002/0078035 A1 | 6/2002 | Frank et al. | |
| 2003/0135490 A1 | 7/2003 | Barrett et al. | |
| 2004/0047287 A1* | 3/2004 | Tremblay et al. | 370/229 |
| 2005/0182770 A1 | 8/2005 | Rasmussen et al. | |

OTHER PUBLICATIONS

McCurley Kevin S.; "Geospatial Mapping and Navigation of the Web", ACM 1-58113-348-0/01/0005, pp. 221-229.
Schilit et al. "Challenge: Ubiquitous Location-Aware Computing and the "Place Lab" Initiative", ACM 1-58113-768-/0/03/0009 pp. 29-35.

* cited by examiner

*Primary Examiner* — Isaac M Woo
(74) *Attorney, Agent, or Firm* — Nixon Peabody LLP

(57) ABSTRACT

A local search engine geographically indexes information for searching by identifying a geocoded web page of a web site and identifying at least one geocodable web page of the web site. The system identifies a geocode contained within content of the geocoded web page of the web site. The geocode indicates a physical location of an entity associated with the web site. The system indexes content of the geocoded web page and content of the geocodable web page. The indexing including associating the geocode contained within content of the geocoded web page to the indexed content of the geocoded web page and the geocodable web page to allow geographical searching of the content of the web pages.

15 Claims, 11 Drawing Sheets

SEARCH ENGINE AND INDEXING TECHNIQUES

CROSS REFERENCE TO RELATED APPLICATIONS

This Patent Application claims priority and is a continuation of U.S. patent application Ser. No. 11/761,082 filed on Jun. 11, 2007, now U.S. Pat. No. 7,822,705 entitled, "METHODS AND APPARATUS PROVIDING LOCAL SEARCH ENGINE", which is itself a continuation of U.S. patent application Ser. No. 11/032,385 (now U.S. Pat. No. 7,231,405) filed on Jan. 10, 2005, entitled, "METHOD AND APPARATUS OF INDEXING WEB PAGES OF A WEB SITE FOR GEOGRAPHICAL SEARCHING BASED ON USER LOCATION," which claims the benefit of U.S. Provisional Patent Application No. 60/568,975 filed on May 8, 2004, entitled, "METHODS AND APPARATUS PROVIDING LOCAL SEARCH ENGINE", the contents and teachings of which are hereby incorporated by reference in their entirety.

BACKGROUND

Conventional computer networking environments support the exchange of information and data between many interconnected computer systems using a variety of mechanisms. In an example computer-networking environment such as the Internet, one or more client computer systems can operate client software applications that transmit data access requests using one or more data communications protocols over the computer network to server computer systems for receipt by server software application(s) executing on those servers. The server software application(s) receive and process the client data access requests and can prepare and transmit one or more server responses back to the client computer systems for receipt by the client software applications. In this manner, client/server software applications can effectively exchange data over a network using agreed-upon data formats.

One example of a conventional information exchange system that operates between computer systems over a computer network such as the Internet is provided by a set of applications and data communications protocols collectively referred to as the World Wide Web. In a typical conventional implementation of the World Wide Web, client computer systems operate a client software application referred to as a web browser. A typical web browser operates to provide hypertext transport protocol (HTTP) requests for documents, referred to as "web pages," over the computer network to web server computer systems. A web server software application operating in the web server computer system can receive and process an HTTP web page request and can return or "serve" a corresponding web page document or file specified (i.e., requested) in the client request back to the requesting client computer system over the computer network for receipt by the client's web browser. The web page is typically formatted in a markup language such as the hypertext markup language (HTML) or the extensible markup language (XML).

The World Wide Web contains billions of static web pages, and it is growing at a very fast speed, with many hundreds or thousands of web pages being created and placed for access on the Internet each day. To be able to efficiently access web pages of interest to people using web browsers, software developers have created web sites that operate as search engines or portals. A typical conventional search engine includes one or more web crawler processes that are constantly identifying newly discovered web pages. This process is frequently done by following hyperlinks from existing web pages to the newly discovered web pages. Upon discovery of a new web page, the search engine employs an indexer to process and index the content such as the text of this web page within a searchable database by producing an inverted index. Generally, an inverted index is defined as an index into a set of texts of the words in the texts. A searcher then processes user search requests against the inverted index. When a user operates his or her browser to visit the search engine web site, the search engine web page allows a user to enter one or more textual search keywords that represent content that the user is interested in searching for within the indexed content of web pages within the search engine database. The search engine uses the searcher to match the user supplied keywords to the inverted indexed content of web pages in its database and returns a web page to the user's browser listing the identity (typically a hyperlink to the page) of web pages within the world wide web that contain the user supplied keywords. Popular conventional web search engines in use today include Google (accessible on the Internet at http://www.google.com/), Yahoo (http://www.yahoo.com/), Lycos (http://www.lycos.com) and many others.

SUMMARY

Modern conventional search engines are able to find relevant web page content results based on user supplied search keywords. However, a search using a web browser can find information contained in web pages located all over the world. However, if a user is looking for a web site that is associated with a local business or organization, conventional search engines provide search results that may be overwhelming and not geographically relevant to the user's location of interest. For instance, searching for a restaurant in the small town of Dayton, N.J., in the United States using Google provides a large amount of web pages that are not related to restaurants in Dayton, N.J. By way of example, the search results may provide links to a web page for a restaurant in Dayton Ohio, which is thousands of miles away.

Some conventional web sites provide web pages that are limited to a local geographical area. For instance, community-based web sites may contain links to web pages for restaurants, physicians, apartment rentals, home services and the like for a certain geographical regions, such as a large city and are thus relevant to web users in that local area. In contrast, there are a large number of web sites that have no physical location constraints. For example, yahoo.com may be relevant to people everywhere, but search results for local areas are often cumbersome to work with when searching for a specific business or other entity within a specific geographical region.

Embodiments of the invention significantly overcome the geographical searching deficiencies of conventional search engine web sites used to provide information to users of the computer networks such as the Internet. In particular, embodiments of the invention are based on the observation that there are no geographical boundaries to information stored on the World Wide Web. However, people using the Internet are often still constrained by their physical locations. For example, many people live, work, dine, shop and enjoy life in their local area most of time. Thus, local information is more valuable for customers nearby. Traditionally, people use an information resource such as a phone book (e.g., yellow pages) to find a local or small business. A phone book such as the yellow pages lists business names, addresses, phone numbers or general advertising words describing the business.

In contrast to a phone book, a web site on the Internet can be reached everywhere and is not constrained in the amount of content it provides. However, the mere presence of a web site on the Internet does not mean a consumer thousands of miles away is going to buy from a remote web site. Local advertising is much more effective when it offers products and services in the geographical area of the consumer, and this is especially true for small or medium-sized businesses. In the US, there are about 10 million small and medium sized enterprises. A small enterprise typically has less than nine employees and conducts a majority of its business within 50 miles of its location. As such, embodiments of the invention are also based in part on the observation that consumers want to find local products or services, and entrepreneurs like to reach local consumers.

One advantage of configurations described herein is that they help to solve the problem of how to let a local consumer reaching local web sites. Conventional web sites do not adequately solve this problem since conventional search engines treat each word in web pages as keyword. Geographic information is no exception. Thus, for a query such as "Restaurant Dayton NJ", a conventional search engine will find web pages containing the words "Restaurant" "Dayton" and "NJ". A web page in Ohio may contain the three words and lead to a page that is not geographically located nearby to the user supplying those search terms.

Another observation upon which embodiments of the invention are based in part is that geographically related web pages are often buried inside web sites on the Internet. As an example, if a business has a web site with numerous web pages that are all accessible within a domain name of that company, only a small number of those pages might contain geographical information concerning the company, such as its address of business. Conventional search engines have no way of associating the geographical information contained within one web page of a web site to other pages of that site for searching purposes. Embodiments of the invention provide such a capability.

Another problem of conventional search engines that is addressed by configurations described herein is the relative speed of results retrieval. There are billions of static web pages existing on the World Wide Web. The count does not include the "hidden web" documents that are generated dynamically through Relational Database Management Systems (RDBMS). The hidden web page count is estimated to be 400 to 500 times larger than statically defined pages. Even though the size of the Internet is huge, people still demand web page search results within 1 second. This makes the response time barrier of general search engines quite high. The most advanced search engines, such as Google, contain only a fraction of all Internet web pages (currently equal to about 4 billion pages). Google uses about 10,000 web servers to process a query. Since conventional search engines search keywords one web page at a time, such conventional search engines can only find web pages that contain the searching text. In a typical local business web site, the geographical information may be contained and displayed in the content of only a few web pages such as the direction page, contact page or the like. The other pages may have no geographical words at all. As a result, a conventional search engine can not geographically reference the other web pages that have no geographical words inside. Accordingly, conventional search engines are not geographical aware of pages that contain no geographic reference information and do not exclude web sites that are irrelevant to physical locations.

Relational Database Management Systems (RDBMS) have been used in web sites that provide some local search capabilities. Such conventional web sites organize information according to location and store it into a relational database. Online yellow pages, such as Superpages for instance (www.superpages.com), store local business information in a relational database and utilize SQL language for searching. The database contains business name, address, and telephone data. The web page content of a business is not searchable since it is not stored in the relational database. Thus conventional services such as online yellow pages are not a true local search engine.

In another conventional attempt at providing geographic information via web searching, Mobilemaps.com stores an inverted index of full web page and geographical information to a MySQL database. In this case, the web pages are searchable in theory. However, a practical local search engine contains several hundred million web pages. The total size of all web pages combined may be several hundred gigabytes. A RDBMS is not efficiently capable of handling that amount of data.

There are some other conventional approaches to navigate web pages by geographic proximity, such as those described for instance in the paper entitled "Geospatial Mapping and Navigation of the Web" by Kevin S. McCurley, the entire contents of which is hereby incorporated by reference herein in its entirety. One system described in this paper can only list Uniform Resource Locators (URLs) by geographic location and this system has no search capacity. The geographical information is obtained from a remote Whois or IptoLL data source. However, since the commercialization of Internet, such remote resource databases have been dispersed to several organizations and usage is now constrained by proprietary interests. In another paper "GeoSearcher: Location Based Ranking of Search Engine Results", Carolyn Watters and Ghada Amoudi introduce a conventional system that can sort the first 200 results from a general search engine altavista.com by geographical distance. That Watters/Amoudi system also uses the Whois and IptoLL for geographical information. The Watters/Amoudi system is a meta search engine which presents a custom format of results of third party search engine. The system by itself has no searching ability and again it relies on a proprietary geographical database that is not available or highly accurate.

Other conventional systems provide a ranking of search results in relation to the user supplied search words. Ranking web pages is an important part of conventional search engine operation. As an example, a typical user tends to provide one or two keywords to a conventional search engine. As a specific example, the keyword "java" by Google returns 65,800,000 web page hits. The same keyword "java" by Yahoo returns 53,900,000 records. There are so many hits with conventional web sites that a user is unable to realistically visit the web pages of every one of such hit. Using conventional search engine technology, any web document containing "java" will be included in the hits. The first hit of Google is http://java.sun.com. The first hit in Yahoo is http://www.sun.com. Both Google and Yahoo provide results that indicate java is a programming language from Sun Microsystems. However, the word java has many other meanings. People that are not familiar with java programming language would be surprised at the search results. The reason why do Google and Yahoo rank the java programming language first instead of a coffee shop is because of the ranking algorithm used by these web search engines. As an example, a ranking system called PageRank is considered the foundation of Google. U.S. Pat. No. 6,285,999 entitled "Method for node ranking in a linked database" described a page rank system used by Google. The entire content of U.S. Pat. No. 6,285,999 is hereby incorporated by reference in its entirety. The PageRank system calculates recursively the rank score of web page by looking at its linked web pages—that is, those pages that link to (i.e., that contain a hyperlink that reference the URL of) the page being ranked. A higher ranked web page has a higher weight in the ranking equation. Because of the way in which the PageRank algorithm operates, some companies hire so called search engine marketing experts to build web pages linked with each other to boost the score by increasing the number of remote web pages that reference a particular companies web site.

For a small business's web site that has only a few sites linked to it, or for businesses that do not have the money to boost PageRank by search engine marketing experts, search engines that use page ranking provide results that contain the small business site referenced deep into the search results, often resulting in consumers missing those small business sites. Since the small business web site's PageRank is low, even if it can be searched by a traditional search engine, the results indicating the small business web site will be hundreds of pages away in the search results. Embodiments of the invention significantly overcome this problem using a unique ranking system that incorporates geographic location as well to rank a page based on other pages of other sites that are local to the page being ranked.

Another system disclosed in U.S. Pat. No. 6,282,540 entitled "Method and system for providing a web-sharable personal database", the entire contents of which is hereby incorporated by reference herein, details a system for providing a web-sharable personal database with proximity searching capability. The system described in this patent is not a local geographic based search engine. Instead, it focuses on create a personal database and stored address information in database. Furthermore, it did not address the challenge of mixing the power of conventional search engine with geographical awareness.

Embodiments of the invention significantly overcome drawbacks of conventional search engines and provide mechanisms and techniques for geographically indexing information using a unique search engine architecture. Generally, the search engine configured in accordance with embodiments of the invention is capable of performing a web crawling process to identify web pages of a web site. This can include traversing links originating from a seed web page to identify new web pages of the web site and stripping the content of web pages of the web site to a format containing only text. Some of the web pages of the web site may be geocoded. A geocoded web page can contain, for example, addressing information that can be used to either directly identify a physical location of a business or other entity associated with the web site. Alternatively, a geocoded web page containing information such as a telephone number may be used to perform a manual or automated lookup operation to identify the physical location of an entity associated with the web site. The system thus identifies a geocoded web page of a web site and identifies a geocode contained within content of the geocoded web page of the web site. The geocode indicates a physical location of an entity associated with the web site. The system also identifies at least one geocodable web page of the web site. The geocodable web page of the web site might be any page that does not contain geocoding information such as an address but nonetheless is associated with the web site (e.g., has a URL that is within the same domain as the geocoded web page). The system then indexes content of the geocoded web page and content of the geocodable web page(s). The indexing includes associating the geocode contained or derived from or within content of the geocoded web page to the indexed content of the geocoded web page as well as to indexed content of geocodable web page to allow geographical searching of both the content of the geocoded and geocodable web pages.

In this manner, for a typical web site that has numerous pages that do not contain addressing information, the system of the invention will identify those pages (i.e., geocodable web pages) of the web site and will produce a geocode representing the location specified within the geocoded web pages (i.e., the those web pages the do contain an address of the entity associated with the web site). The system produces an index that associates the pages that did not contain addressing information to the geocode discovered on the pages the did contain addressing information, such that non-address containing pages can be geographically indexed according the geocode of those pages that do contain addressing information. Since the pages are related as being part of the same web site, the existence of the geographical information specified by the address of any page in the web site can be used to geographically associate to all pages of the web site within the index. Accordingly, the system of the invention allows a search provided by a user searching for pages containing content and that are located within a specific geographic location (e.g., a user supplied ZIP code for example), to be applied to pages associated with that geographic location but that did not contain specific addressing information.

Configurations disclosed herein also provide the capability to sort the content of the geocoded and that geocodable web pages based on the geocode to associate the content of the geocoded and geocodable web pages to a folder representing a geographic region that is inclusive of the geocode. The folder is selected from a plurality of folders each representing a respective geographic region that is different from the geographic region of other folders. As an example, there may be a folder representing each state within the United States of America.

Once within folders, the system performs georanking of content of the web pages associated with the folder by analyzing link popularity of links contained within content of other web pages associated with the folder that reference those web pages. In other words, in one example configuration, if a folder contains indexed content of all web pages associated with geocodes specifying locations within a particular state of the United States of America, link analysis can be performed to rank the content of individual pages associated with entities within the state based upon the number of links to that paid from other pages associated with entities also contained within that state. In this manner, the system adjusting a georank of a web page referenced by that identified link if the web page identified by that link has a geocode associated with the same folder associated with the web page from which the link was identified.

In other configurations, indexing is performed by generating an inverted index of content within the folder that includes the content of the geocoded web page and content of the geocodable web page. The inverted index includes the geocode and georank for all content indexed and associated with the geocoded and geocodable web pages in the folder. The system provides for geographical searching of the content of the geocoded web page and the geocodable web page(s) relative to the geocode by processing a user query that includes a location against the indexed content of the geocoded web page and content of the geocodable web page to identify web pages within a predetermined proximity to the location specified in the user query that contain content matching the user query.

A crawler, geocoder, geosorter, georanker, geoindexer and geosearcher as described herein can be, for example, computer software that can run in one or more computers, each of which has a memory encoded with a software application providing such processes, and each including one or more processors capable of executing the application code of the crawler, geocoder, geosorter, georanker, geoindexer and geosearcher to provide corresponding respective processes for such components. The processor and memory are interconnected with an interconnection mechanism such as a data bus or other circuitry. The computer(s) can include a network interface to receive queries. Each component may run in a single computer or a cluster of computers. As an example, the crawler, geocoder, geosorter, georanker and geoindexer may be run in computers in a search engine business or web portal. The geosearcher typically runs in a data center and contains a number of server computers for fast performance.

The method and system disclosed herein has major advantages in performing a local search compared with existing conventional apparatus and systems. It is more accurate because it analyzes the geographical relationship among web pages, not just one web page. It is much less expensive to implement than a conventional search engine because it organizes the large amounts of data into smaller subsets. It is also significantly faster since it searches a smaller geographically related data set to find matches as opposed to searching an entire database of all web pages regardless of geography.

Other embodiments of the invention that are disclosed herein include software programs to perform the method embodiment steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein as embodiments of the invention. Such arrangements of the invention are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments of the invention.

It is to be understood that the system of the invention can be embodied strictly as a software program, as software and hardware, or as hardware alone such as within a processor, or within an operating system or another execution environment such as a web server operating search engine software.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION

Generally, configurations of the invention support crawling web pages over a computer network and storing the web pages in a repository and extracting geographical information from certain of the web pages in the repository. The system associates geocodes, based on the extracted geographical information, with the web pages that do not contain geographical information. The system sorts the web pages according to the geographical information and stores the web pages within folders, with each folder containing web pages from a specific geographical region. The system assigns georanking scores for web pages based on link popularity within a geographical region represented by the folder containing the web pages and generates an inverted index of the sorted identified web pages. The system stores geocodes and georanking scores in the inverted index and allows geographical searching of the index over a network to identify web pages having content of interest to a user and located nearest to a user defined location.

Embodiments of the invention are referred to herein as a "local search engine". Upon startup, the local search engine traverses links of a hyperlinked database to identify geocoded web pages. Any hyperlinked database can be the data source of a local search engine. The World Wide Web is the biggest hyperlinked database. In one embodiment, a hyperlinked database of a country is utilized, such as all web sites within United States, or all web sites within Canada. In another embodiment, a hyperlinked database of a state is selected, such as all web sites in state of New Jersey. It is to be understood that the local search engine disclosed herein is not limited to a specific physical area.

A collection of documents that are geographically relevant can be another data source of data to be traversed by a crawler of the local search engine. The documents may be in various formats such as Text, Microsoft Word, Microsoft PowerPoint, PDF, HTML or XML or the like. The documents may be stored in files, or the documents may be stored as records in RDBMS or in any other data format. In one embodiment, the local search disclosed herein is applied for an online local classified web site. The local classified web site stores local classified records in an RDBMS and displays results in web pages. The local search engine disclosed herein is not limited to a specific data format and storage of data source.

Figure 1:
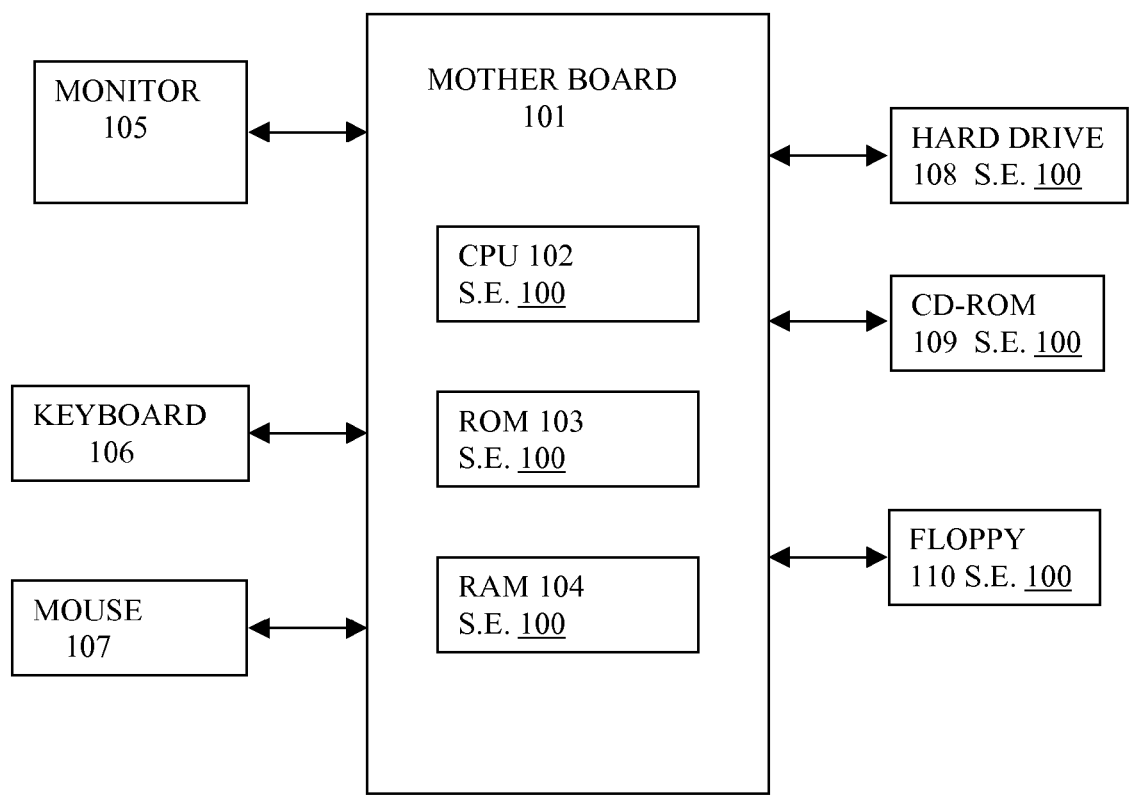
FIG. 1 illustrates a computer system that can be utilized to execute the software of an embodiment of the invention.

FIG. 1 illustrates a computer system that can be utilized to execute the software of an embodiment of the invention. Operation of the system is performed when software embodying the search engine 100 is installed in the computer. A computer configured to operate according to the invention is thus an embodiment of the invention. The computer can operate using an operating system such as Windows, Linux or Unix or any other operating system platform. A typical computer system includes a coupling of a CPU or other processor 102 that can perform execution of the search engine 100, as well as a read only memory (ROM) 103 and/or random access memory (RAM) 104 into which processing logic that embodies the search engine 100 disclosed herein can be encoded. The CPU, ROM and RAM are installed in and coupled via a motherboard 101 (e.g., an interconnection mechanism). In this example, the computer also contains a monitor 105, keyboard 106 and mouse 107 as the input output devices. A hard drive 108 or other media can be used to store a software program and data that embodies the operational techniques of the search engine 100 explained herein. As an example, a CD-ROM 109 and/or a Floppy disk 110 are computer readable mediums that can embody the search engine 100 as well. Various other devices communicate with the computer with various buses. As an example, there may be other devices such as tapes, optical disks, EPROM etc that can be configured in a computer system. A computer system can be a server, a personal computer, workstation, web server, mainframe or any other type of general purpose or dedicated computerized device. One or more network interfaces can be included to allow communication with other computers via a network as is known in the art. The software and algorithm presented herein are not inherently related to any particular type of computer.

Figure 2:
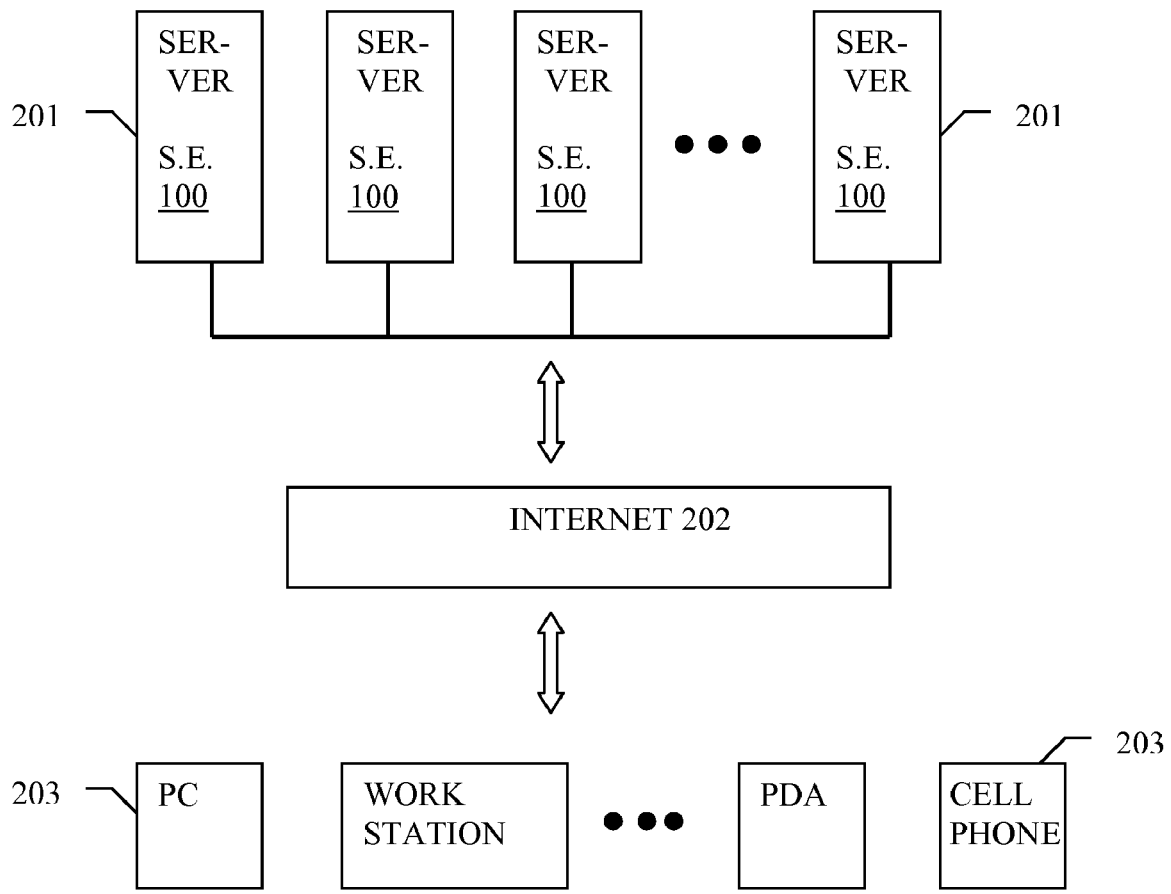
FIG. 2 is a block diagram of a computer network in which the present invention is used.

FIG. 2 is a block diagram of a computer network in which the present invention is used. The computer network such as the Internet 202 includes clients 203 that are connected to servers 201. Servers 201 represent a cluster of computers that store the software and barrels in local storage devices and are configured with the search engine 100 disclosed herein. Severs 201 are connected using a high-speed local network connection. A client 203 can be a personal computer (PC), laptop, workstation, personal digital assistant (PDA) or cell phone, or any other computing device capable of interfacing directly or indirectly to the network 202. The client 203 can provide a query including words and geographic information (e.g., a zip code or other specific geographical information of interest to a user) using a web browser and the search engine 100 operating in one or more of the servers 201 will search results based on the query as explained herein. It should be understood that the communication between clients 203 and servers 201 is not limited to Internet, and other communication networks can be used such as an intranet, extranet, a non-TCP/IP based network, or the like.

Figure 3:
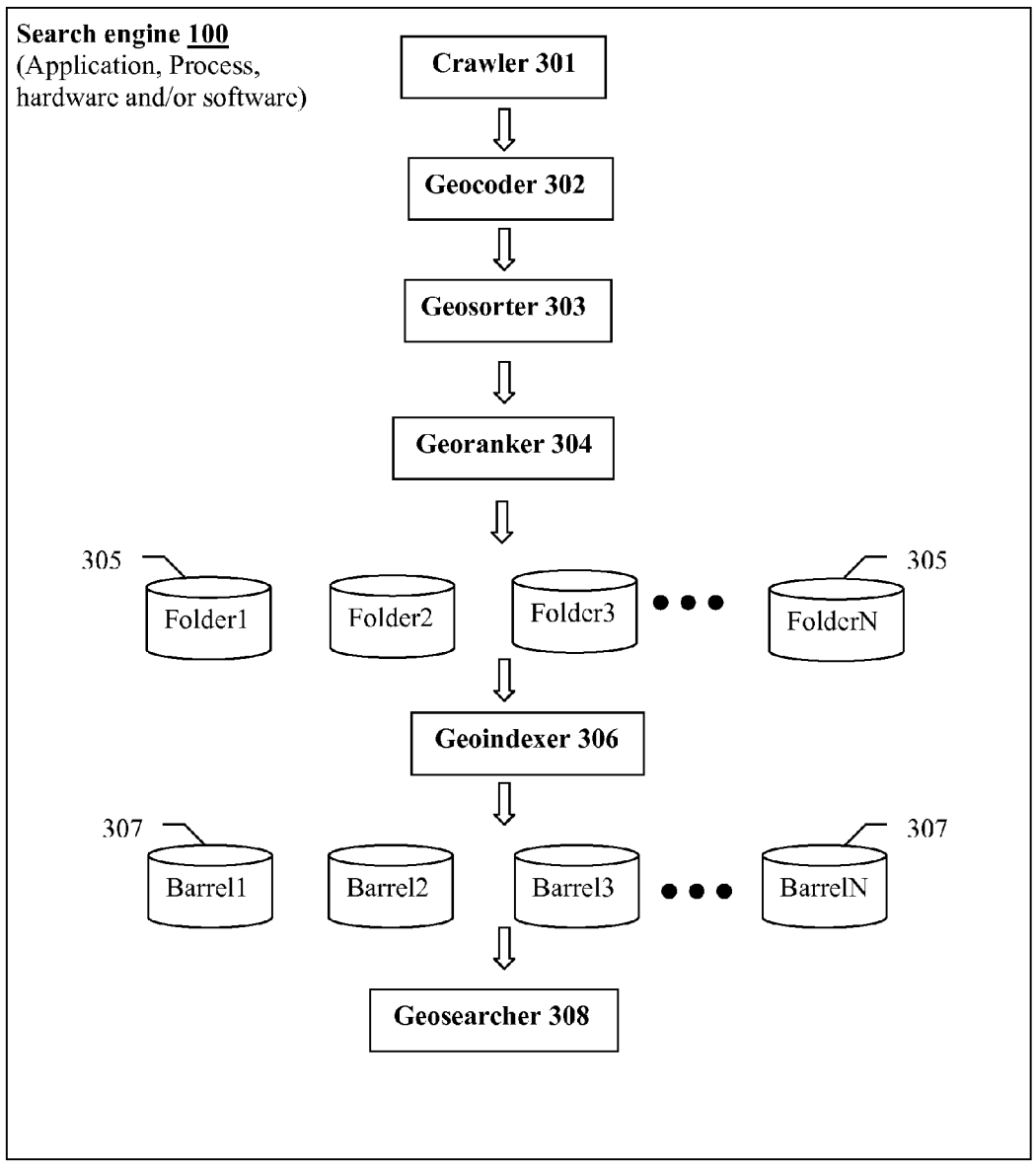
FIG. 3 illustrates an architecture overview of local search engine in accordance with one embodiment of the invention.

FIG. 3 illustrates an architecture overview of local search engine 100 in accordance with one example configuration. According to the high level operation of the system disclosed herein, one or more crawlers 301 operate to download web pages for storage in local hard drives. This can include identifying (e.g., via following links) a geocoded web page of a web site as well as identifying at least one geocodable web page of the web site (i.e., a page that does not have location information therein). As an example, the crawler 301 traverses links originating from a seed web page to identify new web pages of the web site and storing the pages can include stripping the content of web pages of the web site to a format containing only text content.

Next (or concurrently), a geocoder 302 operates to find physical locations, referred to herein as geocodes, from the obtained content of the web pages. The geocoder 302 can analyze relationships among web pages of each web site and assign major geocodes for each web site. A major geocode is defined as the true physical location of a business associated with the web site for which at least one geocoded web page and possibly several geocodable web pages have been discovered. The geosorter 303 sorts web pages and copies them to different folders 305. In one configuration, a folder can be any type of storage area (e.g., directory, database, file system, server farm or group of computers, etc.) for storing related information and does not have to be a folder as known within the art of operating systems. Each folder contains web page data from the same predefined geographical area. The georanker 304 ranks web pages within each folder by link popularity analysis. A higher rank indicates a better quality of web page and indicates that there are other pages within the same folder (i.e., within the same general geographic region represented by the content of pages in that folder) that link to that page. The geoindexer 306 generates an inverted index for each folder. A geocode that represents an address or other physical location associated with that web page is stored along with each indexed web page content. The geoindexer 306 distributes the indexed data into a set of barrels 307. In one configuration, web page data or content in a folder is mapped into one barrel so that each barrel contains a respective inverted index for a certain geographical area. A group of distributed geosearchers 308 (there can be several that concurrently operate) can collectively perform searches against the barrels 307 to find content matching user supplied query terms that include location information.

In one configuration, each software component shown in FIG. 3 is a subsystem that is able to process very large scale data sources. For instance, multiple crawlers 301 can operate to download content from numerous (e.g., hundred, thousands, or even millions, depending upon the scale of the configuration) of web pages per day. The geocoder 302 analyzes the geographical relationships and the geoindexer generates barrels that are efficient for performing a local search. It is preferred to have a configuration in which a geosearcher 308 provides to response to a user query within one second. As such, the geosearcher 308 may be run in distributed servers 201-1 . . . 201-N to meet required searching and user demands.

The web crawlers 301, also called robots, spiders, or the like can identify each web page by a URL that is unique to that page. Web pages can contain URLs the reference other web pages and are thus linked with one another. This is called a hyperlinked database and represents the World Wide Web. During operation, the crawler can download the remote web pages, compress the web page data into a repository such as the folders 305, and store this folder data for access by the other components.

In one configuration, a crawler 301 downloads web pages based on link discovery that begins from a seed URL, and operates to find new URLs from this seed web page. For each new page discovered, the crawler 301 continue to download and discover newly found URLs (i.e., links to other pages) until there are no new URLs that have not been visited. This process can take significant processing time. Allan Heydon and Marc Najork describe a crawler in paper entitled "Mercator: A Scalable, Extensible Web Crawler". In one configuration, the seed URLs provided to the crawler 301 can be regional web sites obtained from a category from a human edited open source web directory known as "dmoz.org". As another example, a good seed web site can be Chamber of Commerce web site for a city or town or state. Using one or more seed web sites, new URLs can be discovered from the downloaded web pages obtained by the operation of one or more crawlers 301. Due to the nature of such web sites, it is likely that the new URLs found from the seed URLs are geographically related.

In one configuration, the crawler(s) 301 compress web pages and store the contents and URLs to a main repository. Compression is done in this configuration to save disk space. As an example, a compression library such as "Zlib" achieves approximately a four to one web page compression ratio. The crawler 301 in this example configuration also generates a document index. A document index keeps information about each downloaded web page document. The document index includes, for example, a document title, a document status, and a pointer to the repository containing the content for that document. Each document is identified by a document identification (docID), which in one configuration is a checksum of the URL for that document. As noted above, the system can operate many distributed crawlers for higher performance. The crawlers can be configured to re-fetch web site content periodically a certain time interval so that the indexed web page content is updated regularly.

In one embodiment, a geographical web site may be submitted as a seed or discovered during a crawling operation by the search engine 100. The web site URL and a physical address of a business or other entity associated with the web site provide for operation of the invention as explained herein. Note that the address content or other location information concerning the entity associated with the web site need not be located on the first (i.e., home) page of the site, but instead may be buried several pages into the web site, for example, on a contacts web page associated (e.g., in the same domain) with the web site. The crawler 301 initially checks that the submitted or discovered URL has been previously identified (i.e., previously crawled). If not, the URL will be included in the processing explained herein. If it has been identified, but the period for re-indexing has elapsed, then the site can be included in the indexing process again and its URL will be marked for re-indexing.

In some situations, some small business or other web sites may be fairly new and they can not be found by hyperlinks from existing web sites. The submission process in one configuration also provides an opportunity for small business owners to include web site URLs into the local search engine using a manual submission process. In other situation, some small businesses may do not have a web site. In this situation, one configuration allows a small business owner to submit to the search engine 100 the business profile in an online format. The information can include the business title, business description, physical addresses, open hours, contact phone number, etc. The information is complementary to crawler operation and can serve as another data source for the search engine 100.

Embodiments of the invention are based in part on the observation that geographical information is not always readily available in all web pages of a particular web site. In addition, there is no standard with regard to how to embedded geographical information is provided in a web page. A web site known as "Geotags.com" proposes the use of a special geotag in HTML pages. The geotag is a META tag in HTML page that contain geographical information, but it has yet to be standardized and is not widely used. Accordingly, even though such tag exists, since META tags are not visible to humans and are only visible to conventional search engines crawlers, and thus use of such tags can be spammed and abused by webmasters for example by duplicating the tags in pages. This is especially the case for commercial driven conventional search engine optimization. For instance, the content META tag is designed to describe the content of a web page. Content META tags are used by many conventional search engines and such use provides an opportunity to describe a web page that is irrelevant to the true web content in contrast to the content META tag. Thus, content META tag has been abandoned by most search engines as an indicator of content of web pages. The system of the invention uses location information that is visible both to the user as text and to the search engine, and thus does not require the user of any special geotag in HTML.

Another approach of conventional search engines is to provide a system for geographically authenticating electronic documents, such as that described in US patent application publication: 20040064334 "Method and apparatus for providing geographically authenticated electronic documents", the entire contents of which is hereby incorporated by reference. In the system disclosed in publication 20040064334, a digital certificate is created and stored for a web document and its geographical information. However, the processing cost of such infrastructure is high and all web site owners must enable such technology to participate.

One configuration of the system disclosed in accordance with the present invention uses the visible section in web pages, such as text content containing address information, phone numbers or other location specific information to find geographical information. As an example, when a user wants to find the location of an entity associated with a particular web site, that user will look at the most likely web pages such as a contact page, an about page, a home page or similar page to find the address of the entity. If there are multiple addresses, a user will analyze the relationship among all addresses and pick the most likely one. Users will not check a certain tag in an HTML page, and they will not check a Whois or similar database to determine a web site's physical location either.

The Geocoder 302 as disclosed herein is able find locations (i.e., geocode information such as an address, phone number, etc.) in a similar way as do human beings. In order to find a reliable and precise location, the Geocoder 302 in one configuration analyzes relationship among all web pages of a web site to determine the true geographical location. As an example, pages within the same domain (e.g., the web site is www.xyz.com and all page URLs for this site have this as part of their URL) can have a geocode associated to them (i.e., by the geocoder 302) based on an address in the text content of one of the pages of the site, even if this page is not the home page.

Figure 4:
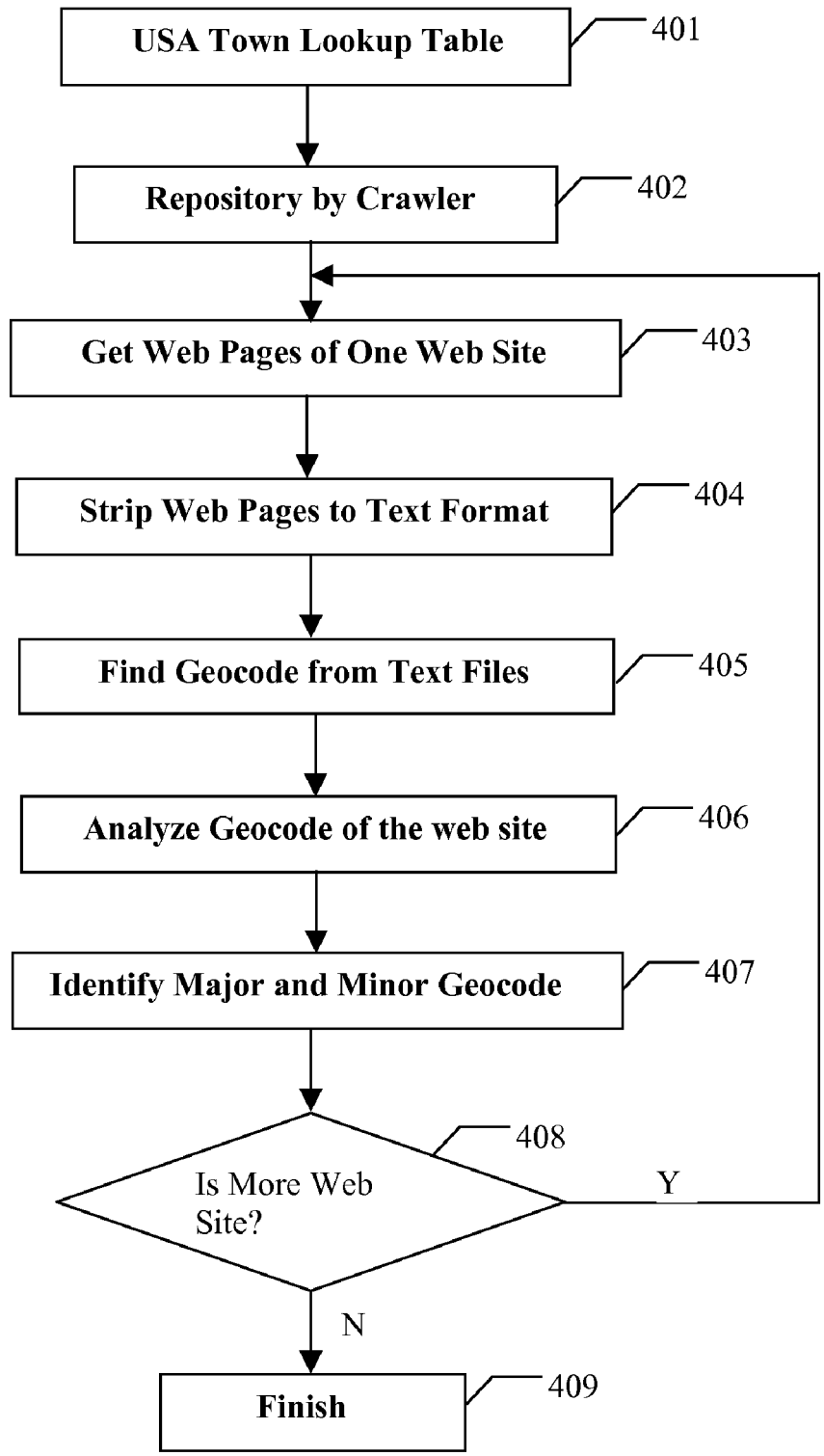
FIG. 4 illustrates a flow chart of a geocoder in accordance with one embodiment of the invention.

FIG. 4 illustrates a flow chart of processing steps performed by a geocoder 302 in accordance with one example configuration. Generally, the geocoder 302 operates to identify a geocode contained within content of the geocoded web page of the web site. The geocode indicates a physical location of an entity associated with the web site. The geocoder 302 identifies geocodes contained within content of the geocoded web page of the web site, the processing operates for at least one web page within the web site and identifies the web page as the geocoded web page if the text content of that web page contains either i) a geocode such as an full address (e.g., street, city, state, zip) in a complete form within the text content of the web page or if the page contains at least a portion of the geocode within the text content of the identified web page. If the geocoder 302 discovers that a portion of the geocode within the text content of the identified web page is present, the geocoder 302 can perform, in one configuration, a secondary lookup operation to identify remaining content of the geocode. This can include performing, for example, a table lookup to find missing portions of the geocode or a manual lookup allowing a person to supply missing portions of the geocode.

Once the geocode is discovered in the content of a geocoded web page, the geocoder 302 associates the geocode of the geocoded web page to all of the geocodable web pages of the web site that do not contain addressing information that can be geocoded, such that all web pages of the web site that do not contain addressing information that can be geocoded can be searched geographically.

In this example in FIG. 4, in step 401, the geocoder 302 obtains a USA town lookup table, such as a ZIP code table. A physical location is defined as geocode. Each web site may have one or more geocodes on one or more web pages. For instance, a small business can have one or more physical offices. The web site of the small business is related to the physical office locations. One purpose of geocoder 302 is to identify the physical locations related to or specified in content of the web site. In one embodiment of the invention, geographic information of United States is extracted from each web page. To do so, a look up table containing all of the US town, state, zip code, latitude and longitude can be constructed or obtained in step 401. A repository in step 402 is accessed that contains all of web pages downloaded by crawler 301. The repository is a large collection of web pages crawled by the crawler 301 from many web sites. Each web site can be identified by a unique domain name and consists of a number of web pages having URLs within that domain. Web pages of an unprocessed web site can be fetched in step 403. The web pages are stripped to text format in step 404. As an example, special tags are eliminated since a typical HTML file contains certain tags such as <HTML>, <H1>, <BODY> <P> etc. The tags follow the W3C standard and are useful for display, but the tags are irrelevant to content used for search. The stripped text file is used for the rest of the example discussion provided herein.

A US physical location (e.g., a US geocode) typically includes a street address, a town or city name, a state name and a zip code. A geocode of each web page is extracted in step 405. The street address has to be present to be considered a valid geocode in one configuration. With regards to the town, state and zip code, there are several possible variations of the data that the geocoder 302 encounters. In one variation a page only contains a town and state name. However, using an automated lookup operation, based on the town and state name, the geocoder 302 can check the look up table for the correspondent zip code. In another variation, there is only town name and zip code. In this case, the state name can be found from the look up table. In another variation, there is only a state name and zip code. In this case, the town name is identified from the look up table. In another variation, there is only a zip code. Based on a zip code, the town and state name can be determined from the look up table. The geocoder 302 can provide processing to support all these variations in order to extract and identify a full and final geocode. Thus a full final geocode contains street name, town name, state name and zip code. In an alternative configuration, a new geocode tag can be defined within a markup language such as HTML or XML and can include specific geographic identity information. If the crawler 301 detects a page containing tagged geocode data, the geocoder can recognize this and process it accordingly without having to analyze the text content of the page. Thus the geocode information can either be obtained dynamically from analysis of the textual content of a page, or the geocode can be explicit within the markup language encoded data or page.

In one configuration, once a geocode has been recognized and parsed, it can be further mapped to a coordinate system such as latitude and longitude. The latitude and longitude are useful to calculate distances between two physical locations. The location can be displayed in a graphical or electronic map based on latitude and longitude as well. Note that the geographic information is not limited to United States. The geographic information of each country is organized as a known format. Thus the geocode detection method explained herein can be adapted to any country.

Continuing on with the flow chart in FIG. 4, the geocode of each web page for a web site is analyzed in step 406. In configurations of the invention, a concept of major and minor geocodes is presented. Major geocodes are primary addresses of a business, while minor geocodes are addresses indicated, for example, in non-contact pages of a business web site. In one configuration, a relationship among all of the geocodes will be checked, and in particular, major geocode and minor geocodes are identified. A business entity may have one or more physical addresses. The addresses should be listed in the web site. A major geocode reflects the actual location of the business. However, in the same web site, it may contain addresses of other reference information. These addresses are considered minor geocodes. The major and minor geocodes are identified in step 407. The process of major and minor geocode detection will be explained further in FIG. 5. After step 407, the geocoder 302 checks if there are unprocessed web site pages remaining in the repository in step 408. If there are, the geocoder 302 will return processing to step 403 and follow the steps explained above until all web sites have been processed.

As briefly mentioned above, the geocode of the geocoded web page may be a major or a minor geocode. Major geocodes are those address appearing on the geocoded web pages that are, for example, a home page of the web site, a contact page of the web site, a direction page of the web site, an about page of the web site, a help page of the web site or a page of the web site that is no deeper than a predetermined number of links below the home page of the web site. The major geocode contains a complete physical address of the entity associated with the web site. In the case of a minor geocode, the geocoder 302 identifies a web page of the web site containing addressing information indicating a minor geocode, which is a geocode other than the major geocode (i.e., on a page other than those listed above). In such cases, the geocoder 302 associates the major geocode to the web page of the web site containing a minor geocode and further associates the minor geocode only to the web page of the web site containing addressing information indicating a minor geocode (i.e., only to the content of the page containing that minor geocode), such that the web page of the web site containing the minor geocode is searchable using the major and minor geocodes. In this manner, if a web site has a page containing address information and that page is not for example, a home page of the web site, a contact page of the web site, a direction page of the web site, an about page of the web site, a help page of the web site or a page of the web site that is deeper than a predetermined number of links below the home page of the web site, then the address information on that page is a minor geocode and is only used as a location index to the content of that page, whereas a major geocode is associated with all content of all pages of the web site, including the page with the minor geocode address information.

Figure 5:
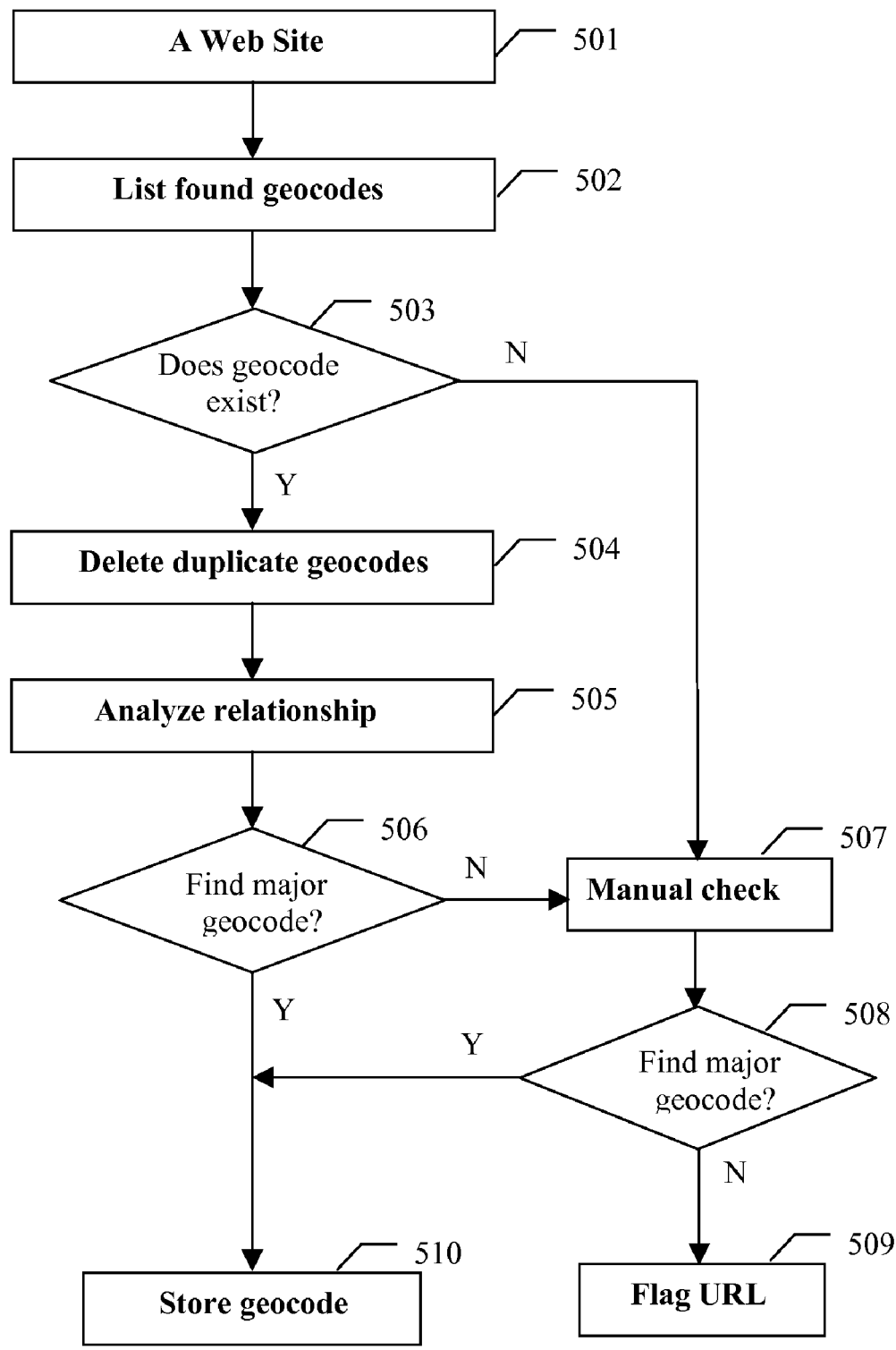
FIG. 5 illustrates a flow chart of finding major geocode. Major geocode represents the physical office location of a geographical related web site in accordance with one embodiment of the invention.

This is further illustrated in FIG. 5, in which a major geocode is identified. A major geocode represents the physical location of a web site's business. The search engine 100 analyzes relationship of geocodes in a web site to determine the major geocode for that site. In one configuration, several empirical rules operate to find such relationship. In one case, a major geocode typically exists in a home page, a direction page, a contact page, an about page or a help page. The home page is the entry or first level of a web site. A small business web site usually has the address listed in home page. A direction page contains transportation information to the physical location. A contact page, an about page and/or a help page may also contain the physical location. Alternatively, a major geocode may be specified as any address that appears within M levels deep from the home page (where M is an integer, such as 5). The assumption is that a business shall list its physical location within a reasonable number of links from the top level web page. If there are multiple geocodes in a web site, they shall be listed in the same web page, or their anchor texts can be found in one web page. It is to be understood that more or less of such rules can be used, depending upon the embodiment of the invention.

For a given web site in step 501, the geocoder 302 obtains all geocodes found for web pages in 502. The geocoder 302 judges whether there is geocode existing in step 503. If there is no geocode at all, it reaches step 507, and the web site can be marked to be manually checked (e.g., by an administrator operating the search engine 100) to determine a major geocode. If there are geocodes, the geocoder 302 deletes duplicates geocodes from the lists in step 504. If two geocodes have the same address, city and state name, they are considered to be duplicates. The relationship of remaining geocodes is analyzed by empirical rules in step 505. Next the geocoder 302 determines whether the major geocode is found in step 506. If there is no major geocode found by the software, the web site will be manually checked to determine the major geocode in 507.

Geographical information has a great variety of representations in any particular web site. Some web sites can display information in an unusual way. Other web sites might use a graphical image to store the geographical information. However, in some cases, geographic information within an image cannot be recognized by computer program easily. Alternatively, text-in-image recognition software can be used if no geocode is found for a web site, but there are graphical images in various pages of the site. In such cases, the site can be revisited to obtain the images of each page and each image can be scanned to determine if an address is graphically shown in a graphic.

Alternatively, the geocoder 302 can provide a manual mode to catch these situations in which the web site is flagged and an administrator visits the site to determine the proper geocode. If there are major geocodes found in manual mode, the major geocodes can be entered into the system manually. The geocoder 302 checks whether there is major geocode found in step 508. If there is still no valid geocode available, the web site URL will be flagged to avoid a future crawl of the web site in step 509. In one configuration, the geocoder 302 is not interested in web sites that have no geographic information. Finally in step 510, geocodes are stored in a hard drive or other repository along with the web pages content.

Note that in one configuration, major geocode and minor geocodes are handled differently. Major geocodes are stored with every page of the web site, whereas minor geocodes are only stored with their own web pages. Note that some web pages may not contain geographical information at all. The major geocodes will still be stored along with the content of these web pages, and these are referred to herein as geocodable web pages (since they will have an associated geocode, but do not themselves contain address information). This enables a geographic search of the every web page in a geographically related web site (i.e., in a site that specific some address on some page). For example, a small business web site may list an office location in a contact page. The other web pages of that site may have no geographical information such as an address in their content.

The method disclosed herein thus identifies a geocode by a computer program, by manual editorial review, or it may be obtained from third party data provider using an automated lookup procedure. As an example, some yellow page data providers can provide certain business names, URLs and physical addresses of businesses. The physical address represents the major geocode of a business. In all cases, no matter how the geocode is obtained, the geocode is stored with each page of the web site. Since geocodes are stored along with every page of a web site, the whole web site is searchable by the present invention. This is a major advantage of the present invention over conventional search engines. Note that in one configuration, minor geocodes are stored only with the content of their own web pages. For instance, a chamber of commerce web site may reference many business locations in a web page. These business locations are recognized as minor geocodes and are applicable to their own web pages and not all pages in the chamber site. The system stores minor geocodes along with the web page content to enable the search of the businesses in the page.

Figure 6:
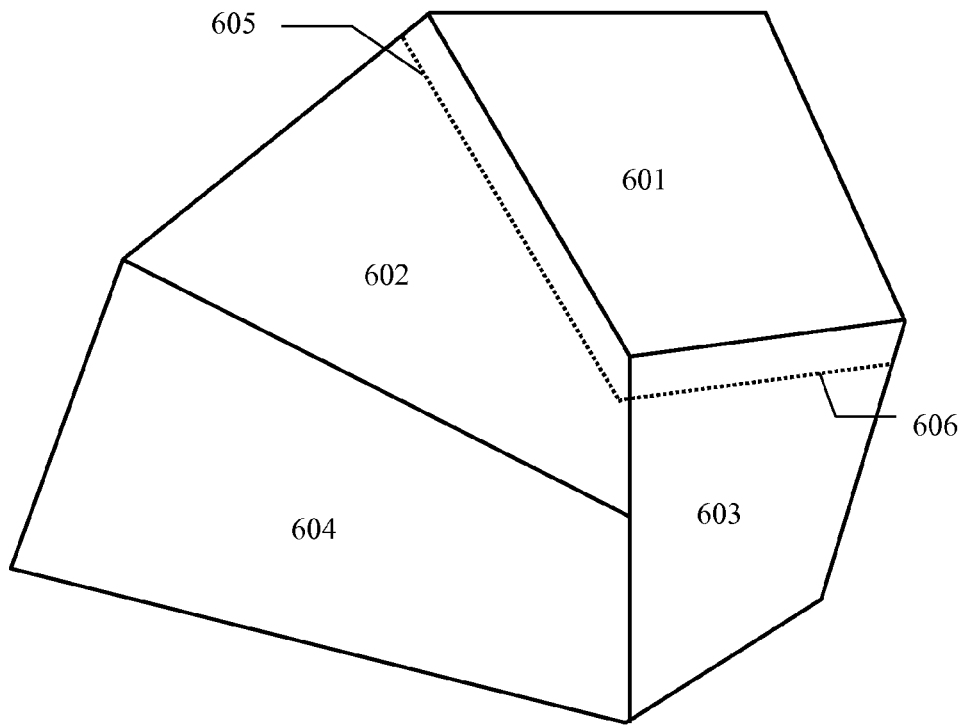
FIG. 6 shows a map of a simulated area.

FIG. 6 shows a map of a simulated area. The actual map could be a real map of a specific country, such as USA map, CANADA map, UK map etc. The example map is for illustration only. In the map, it consists of four regions, 601, 602, 603 and 604. Solid lines are region boundaries. Each region is a geographical area such as a state or a province. Because of boundary effect, people living on or near a border may be interested in businesses located in nearby regions. Thus a business near the border of region 601 might have customers from region 602 and 603 as well. The dashed line 605, 606 is the expanded boundary line of region 601. The dashed line is drawn within at a predefined distance from the solid line. The predefined distance can be 50 miles, or 50 km, or others. In this invention, each folder 305 (FIG. 3) includes overlapping content of web pages from web sites associated with entities located within a certain overlapping distance into the other folder.

One problem with conventional search engines is that they perform searches on content from web pages collected from all over the world. In contrast, configurations described herein can divide the web into different countries and provide a search engine 100 for each, and each search engine 100 can index content locally for each country. Using this approach, the local search engine 100 disclosed herein deals with data in a certain country and the resources needed to process searches are greatly reduced. Second, within each country, the area is further separated into different smaller regions, such as at state or province or county level and each folder 305 can be used to store web page content for that state. Thus searching something in New Jersey does not need to cover content for web pages of web sites for entities located in Ohio.

Figure 7:
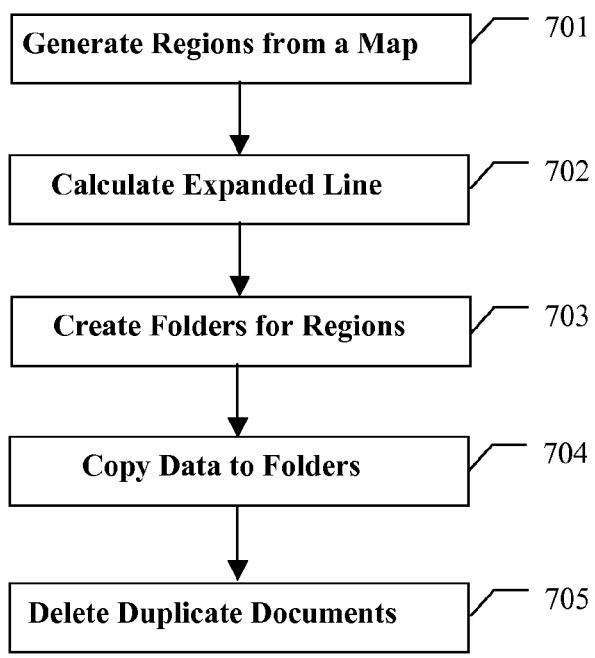
FIG. 7 illustrates a flow chart of a geosorter in accordance with one embodiment of the invention.

FIG. 7 illustrates flow chart of a geosorter 303 operating in accordance with one example embodiments. The geosorter 303 can segment a large repository to geographical related smaller ones of folders 305. In one configuration, the geosorter 303 sorts the content of the geocoded and that geocodable web pages based on the geocode (e.g.,. the major geocode) to associate the content of the geocoded and geocodable web pages to a folder 305 representing a geographic region that is inclusive of the geocode. The folder 305 is selected from a plurality of folders each representing a respective geographic region that is different (but may be overlapping) from the geographic region of other folders. Sorting the content in this manner comprises segmenting a large geographical region into a plurality of smaller geographical regions that collectively represent the large geographical region. The initial setup of the search engine 100 can include creating a different respective folder to represent each respective smaller geographical region of the plurality of smaller geographical regions that collectively represent the large geographical region. The geosorter 303 can identify the folder representing a geographic region that is inclusive of the geocode for a web site and can associate the content of the geocoded and geocodable web pages of that site to the identified folder.

In further detail, in one embodiment, a repository contains web pages of the United States. The geosorter 303 will sort and copy data from the repository to different folders. Each folder holds data for a certain geographical region. The objective is to make data in each folder to be well balanced. As an example, in step 701, the US map is divided into smaller regions such as states. However, some states are much larger and some states are too small, thus some states may be split to smaller areas while many small states may be merged together into a single folder. Folders can be created based on other criteria as well. For example, population is another factor that can be used to decide whether to split or merge folders. For example, the State of California may be divided into northern California, central California and southern California. Delaware may be merged with Maryland in a single folder 305. Alaska is big in size, but the population is small and it may be merged with Hawaii into a folder 305, even though Alaska and Hawaii are far away. Once the boundary distance is defined, a zip code can be associated with a region if the zip code is within the expanded line of the region in step 702.

In step 703, each region is mapped to a folder in hard drive. For instance, it may contain a folder structure/repository/NJ/,/repository/CAN/,/repository/CAC/, /repository/CAS/ etc. The folder/repository/NJ/contains web sites from New Jersey. The folder/repository/CAN/holds data from northern California. The folder /repository/CAC/contains data in central California. The folder/repository/CAS/contains data from southern California.

Note that in one example configuration, each folder can have a list of zip codes associated with that folder and zip code near a state border for example might be included in two folders, since the neighboring folders contain overlapping data, and thus store and have indexed overlapping or duplicate content. Thus content for a web site for a business located on a state line may be contained in two folders that contain overlapping data for businesses on either side of the state line. As discussed above, the major geocode of a web page is found in FIG. 5. If the zip code of the major geocode falls into the expanded or overlapping boundary line of a folder, the web page and related information such as URL, geocode will be copied to the respective folder in 704.

In step 705, the geosorter 303 eliminates duplicate web documents in a folder. Many documents on the web are available under different domain names. It is important to eliminate the duplicates for the benefit of reduced index size and faster search. In one example, an MD5 checksum is calculated for web pages in each folder and duplicate or second copies of web pages having the same checksum value are deleted.

In a conventional search engine such as Google, more than 10,000 computers operate to processes searches, leading to high costs. In contrast to this design, one purpose of the geosorter 303 is to separate the big repository into smaller ones to allow a search engine computer resources list to have a liner relationship with the size of repository. For instance, the query "Restaurant in Dayton NJ" will look at the data in New Jersey region. The data set is about 1/50 of original repository. Thus, the hardware resources required by a search engine 100 of this invention are reduced to 1/50 of conventional one required is using a site like Google. Since geographical related web sites tend to be much smaller than general web sites that are not limited to a particular geographic area, the local search engine 100 disclosed herein only needs a fraction of the resources of a conventional search engine. Furthermore since each small folder repository is geographically encoded, the local search engine 100 only needs to search the geographical related repository containing content associated with a location specified by a user and omits irrelevant results by avoiding searching the other folder repositories 305. In one configuration, small folder regions can be used, such as each zip code area being defined as a folder region in one example configuration.

The georanker 304 provides a unique ranking technique using local links to pages between locally linked web sites. In general, a popular web site often has other web sites linked to it. Link analysis is often performed in conventional search engines to identify the popularity of a web site. As an example, Google uses a PageRank algorithm that provides different weights to linked documents. There are other ranking algorithms such as a hyperlink-induced topic search (HITS) algorithm of Kleinberg that exist as well. However, since the Internet is without geographical boundaries, conventional link analysis includes all web documents regardless of their geographical locations. Using a ranking technique such as that used in Google, typically a small business web site ranks low since the business does not have the marketing power and visibility of a big company. Also a small business web site is only relevant to customers nearby that small business. Even if a small business web site has a very high rank using conventional link analysis due to its popularity, most end users that see this site in search results may find the result irrelevant since it is far away from their location. Thus the conventional ranking of web sites suffers from significant problems when applied to geographical searching.

Figure 8:
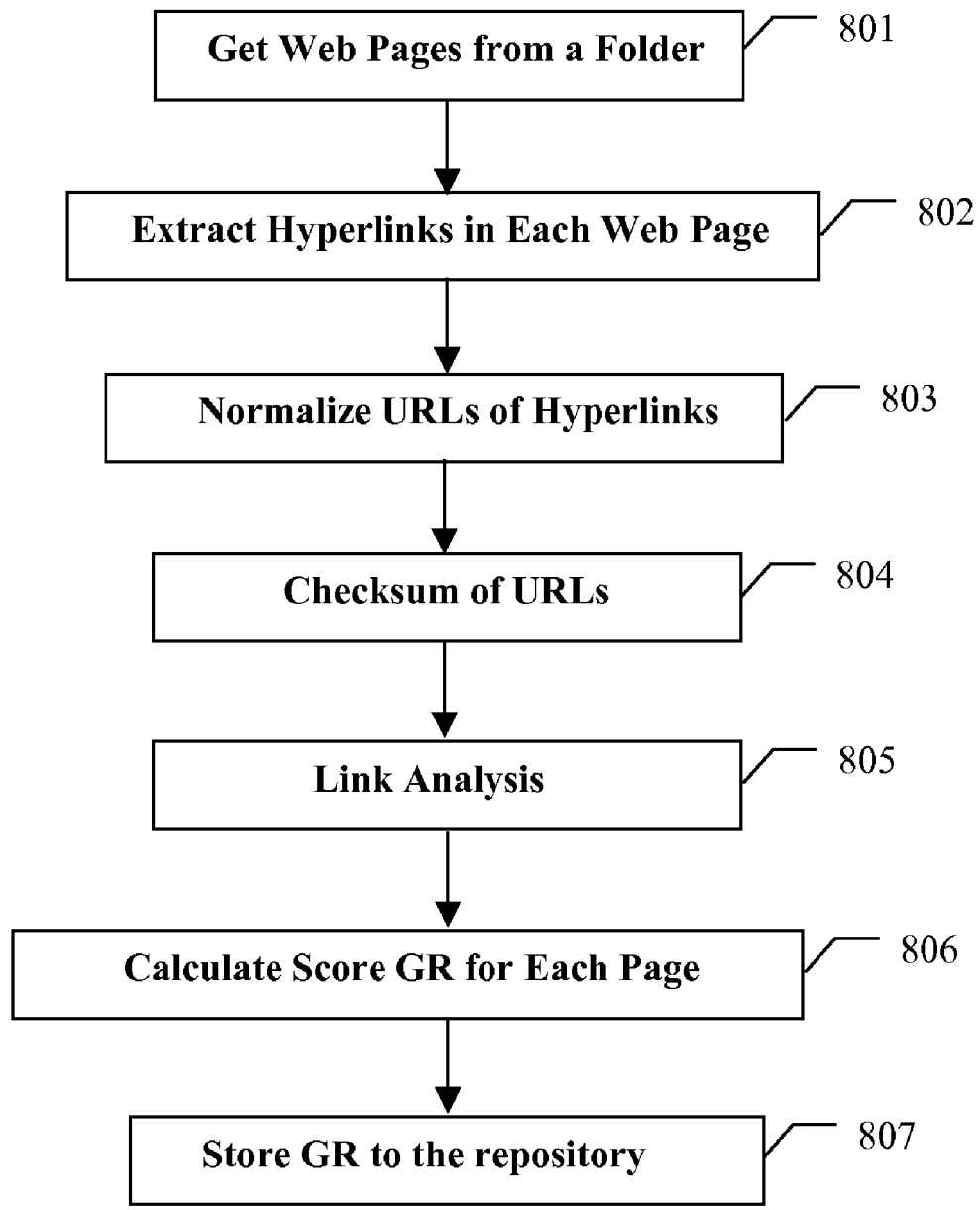
FIG. 8 shows a flow chart of a georanker in accordance with one embodiment of the invention.

FIG. 8 illustrates operation of a georanker 304 that overcomes such problems in accordance with one embodiment. The georanker 304 ranks web documents limited to a specific geographical area specified by the folder 305. Georanker will generate a georank or score (GR), in which a higher score indicates a better ranking of the web document in a region since many other sites in that region link to that site or page. The georank GR is independent of the content of the web document and it is not affected by query string. In addition, the georanker 304 is not susceptible to a common phrase spamming technique to improve the relevance of a searching result.

Generally, the georanker 304 performs georanking of content of the web pages associated with a folder 305 by analyzing link popularity of links contained within content of other web pages associated with the folder that reference those web pages. This can include identifying links in content of web pages associated with the folder. For each identified link, the georanker 304 adjusts (e.g., increments) a georank of a web page referenced by that identified link if the web page identified by that link has a geocode associated with the same folder associated with the web page from which the link was identified. This can also include identifying a weighting factor for each of the web pages within the folder that links to a particular web page in the folder. The weighting factor in one example is dependent on an estimation of the physical distances between the linking web pages. In such a configuration, the georanker 304 adjusts the georank of the web pages being linked to based on the identified weighting factor.

The georanker 304 processing is conducted for the repository of each folder 305 independently. The repository is obtained by the geosorter in FIG. 7 as explained above. Web pages of the same folder are geographical related and thus the georanker 304 determines the ranking of individual web pages in one folder. If web page A links to web page B and they are in the same folder 305, there will be link analysis between the two web pages. However, if web page C links to web page B and they are in different folders 305, there will be no link analysis between C and B, since they are not geographically related.

By using web page data in a repository from a single folder instead of the whole Internet for the link analysis, several major benefits are obtained. Such benefits include: 1) Web sites within an area are more geographically relevant to each other. It is most likely a local township web site will mention a restaurant nearby than thousands of miles away; 2) Web pages from a folder are much smaller than the whole Internet of web pages. A small business web site has good chance to rank higher after being placed in a folder with other web sites in a common geographical vicinity; and 3) Using folder allows the system to be resistant to certain web site link exchange farms. Link exchange farms are notorious for artificially linking to web sites for better search engine ranking positions. These link exchange farms are typically virtual web servers that do not have physical locations. Link exchange farms are excluded in the system by the Geocoder 302. Thus the link farms will have no effect in the link analysis in the present system.

In operation of one example configuration of a georanker 304, as shown in FIG. 8, for each web page of a folder in step 801, URLs of hyperlinks in the web page are extracted in step 802. The URL is further normalized by its domain name in step 803. For instance, the URL string ./help/faq.html for domain www.atlocal.com will be normalized to http://www.atlocal.com/help/faq.html. A checksum is computed for the normalized URL in step 804. The checksum can be a CRC checksum (e.g., 32-bits) and it is unique for each URL. The checksum is used in later steps and it speeds up the overall calculation substantially in this configuration. Link analysis is performed in step 805 and each web page is assigned a score.

One simple score can be the citation number, which is the number of web pages linking to a given web page. Other more complex methods can include PageRank, which is disclosed in U.S. Pat. No. 6,285,999. Another link analysis method is disclosed in U.S. Pat. No. 6,182,091, "Method and apparatus for finding related documents in a collection of linked documents using a bibliographic coupling link analysis" by James E. Pitkow and Peter L. Pirolli. The entire contents of each of these patents are incorporated by reference herein. None of the link analysis is these systems considers the use of a geographical factor. Embodiments of the invention are based in part on the observation that a geographically relevant web site is most likely to link to another web site nearby. When doing a local search, people are interested information in a certain area. For instance, a local township web site might link to a local library, a local police station and several local restaurant web sites. These linkages are provided with a higher weight in the link analysis disclosed herein.

In one configuration, geocodes (e.g., major geocodes) are recognized for a given web site by the geocoder 302. The geographical distance of two web pages can be calculated based on these geocodes. For web pages in the same web site, the distance is 0. For two web pages from different web sites, the distance can be calculated by the system disclosed herein, for example, based on major geocodes' latitude and longitude. If there are multiple major geocodes between the two web sites, the minimal distance can be used in the link analysis.

A distance weight can measure the physical distance between two web pages. If two web pages are close in distance, the weight is high. Otherwise the weight is low. For two web pages, the distance weight can be modeled as a linear function as follows:

$$DW = (MAXD - Distance)/MAXD \quad \text{Equation 1}$$

$$Min(DW) = 0.1 \quad \text{Equation 2}$$

Where DW is the distance weight, MAXD is the maximum distance in local search settings. It is typically set as 50 miles, and Distance is the distance between the two web pages.

In order to normalize result, any DW value less than 0.1 is set as 0.1. The maximum value of DW is 1 and the minimal is 0.1. For web pages in the same domain, DW value is 1 since the distance is 0. For web pages in closer distance, DW value is higher. The DW value may be determined by model other than linear.

The georanker 304 performs a calculation of georank (GR) that provides the link analysis for a collection of geographical related documents. This calculation provides an improvement over the conventional PageRank algorithm by introducing the geographical distance weight in linked web pages. For a given page A, the georank score GR can be determined by the following equation:

$$GR(A) = (1-d) + d^*(GR(T1)^*DW(T1)/C(T1) + GR(T2)^*DW(T2)/C(T2) + \ldots + GR(Tn)^*DW(Tn)/C(Tn)) \quad \text{Equation 3}$$

Where GR(A) is the georank of page A. Page T1, T2, ..., Tn link to page A,
GR(Ti) is the georank of page Ti. Page Ti links to page A,
DW(Ti) is the distance weight between page A and page Ti. It is determined by equation 1 and equation 2.
C(Ti) is the number of outbound links in page Ti,
d is a damping factor, usually it is set as 0.85.

The georank calculation considers the geographical distance as a weight in the equation. Thus it can boost the final GR score for linked web pages in closer physical locations, while the GR score is suppressed for linked web pages far away. In this manner, a local authority web site can be boosted in georank score from the web sites that are close in physical locations.

Returning to FIG. 8, in step 806 a score statistics of the link analysis is calculated. The final score GR is normalized into a range (1, 10), which 10 is the maximum score, 1 is the minimal score. The ratio between the maximum score and minimal is 10. The GR for each web page is stored along with the repository in step 807.

Figure 9:
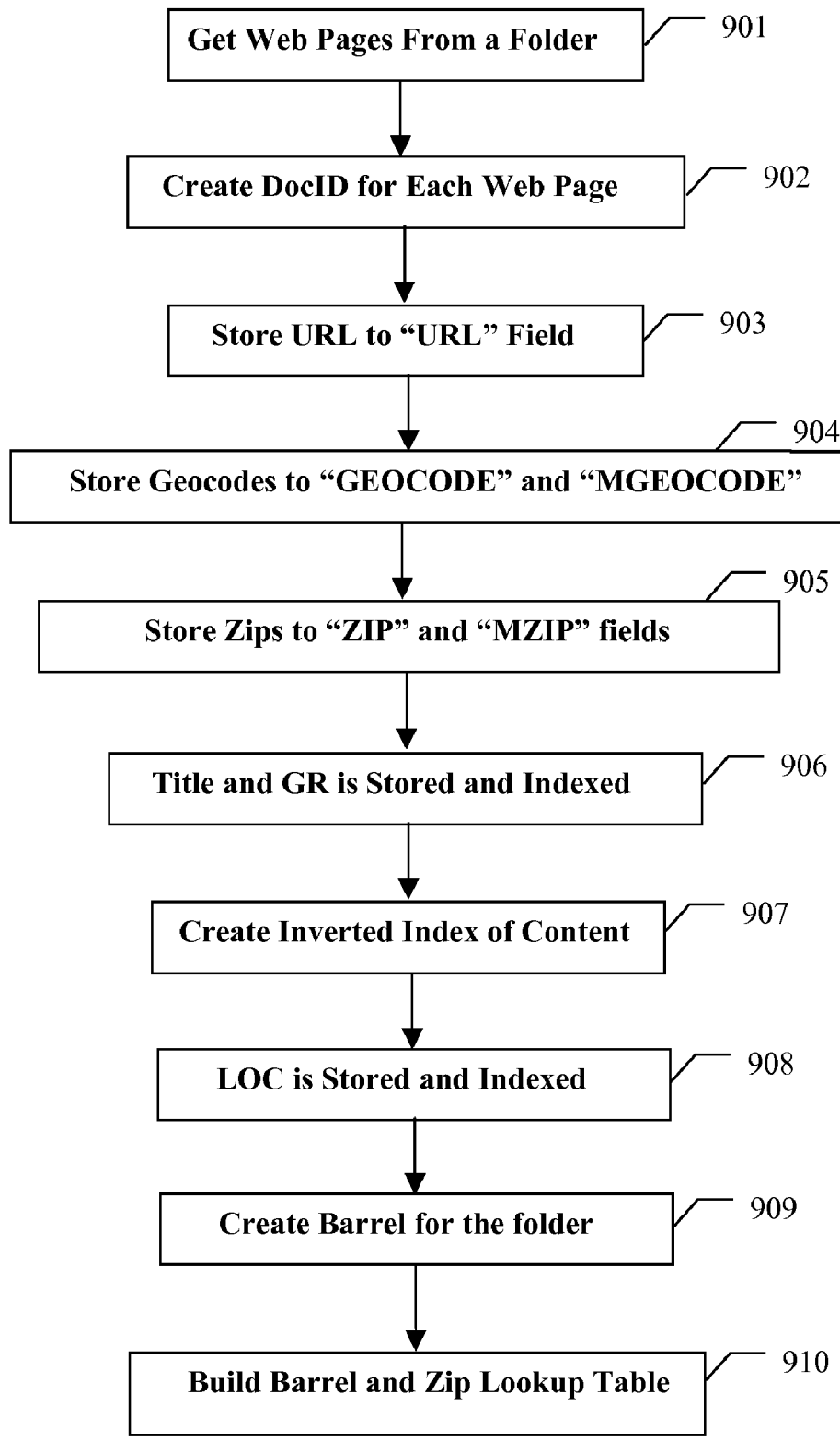
FIG. 9 shows a flow chart of a geoindexer in accordance with one embodiment of the invention.

FIG. 9 shows a flow chart of processing steps performed by a geoindexer 306 in accordance with one example embodiment of the invention. In general, the geoindexer 306 generates inverted index of web documents and stores geographical information in the index. This includes indexing content of the geocoded web page and content of the geocodable web page. The indexing associates the geocode contained within content of the geocoded web page to the indexed content of the geocoded web page and to indexed content of the geocodable web page to allow geographical searching of the content of these pages. The geoindexer 306 generates an inverted index of content within the folder. The inverted index includes the geocode and georank for all content indexed and associated with the geocoded and geocodable web pages in the folder. In particular, for each web page in each folder, the geoindexer 306 produces a searchable content index of content of the geocoded and geocodable web page and derives at least one specific geographic reference based on the geocode. The geoindexer 306 stores the specific geographic reference in relation to the indexed content for each web page within the searchable content index for that folder and indexes and stores a unique document identifier associated with each web page within the searchable content index for that folder.

As noted above, for a web document, it takes several steps to create the inverted index: 1) Special tags are filter out and a TEXT format file is generated. For instance, HTML tags are deleted. 2) The text file is tokenized to a number of words. For example, sentence "There are a few great Italian restaurants in Dayton NJ." is tokenized to "there", "are", "a", "few", "great", "Italian", "restaurants", "in", "Dayton", "NJ". 3) The stop words are eliminated in the tokens. The stop words include common word "a", "an", "the", "in" etc. Because the stop words are so common, it is necessary to filter them out in the tokens. 4) The tokens are stemmed. For instance, "restaurants" is stemmed to "restaurant". "running" is stemmed to "run". So that "restaurants" and "restaurant" are the same in searching. 5) The position of each token is recorded. The position is important to determine the distance of tokens. For example, two close words shall have a higher rank than those far away for a two words query. There are other considerations in the inverted index such as frequency of tokens in a document and batch indexing and update. Details of indexing techniques can be found at the book "Mining the Web, Discovering Knowledge from Hypertext Data" by Soumen Chakrabarti, Elsevier Science 2003, the entire contents of which is incorporated by reference herein.

The geoindexer 306 stores geographical information to index content efficiently, and handles several cases with regards to indexing: 1) A Stored field. A stored field contains a text string that is stored in the index but is not searchable. A stored field can be retrieved efficiently from the index for display. 2) An indexed field. An indexed field is searchable, but it can not be retrieved. 3) stored and indexed field. The field is both stored and indexed, so that it can be searched and retrieved.

In the steps in FIG. 9, for each web page of a folder in step 901, that web page is associated with a unique docID in step 902. Since a URL of each web page is unique, the docID is unique. The docID is stored and indexed for later indexing and searching. URL string is stored as "URL" field in the index in step 903. This enables the search engine 100 to display the URL string in search result. Major geocodes are stored as "GEOCODE" in the index in step 904. This allows the fast retrieval of geographic information of the web page. Minor geocodes are stored in "MGEOCODE" field. In addition, the geoindexer 306 stores the zip codes of major geocodes to a "ZIP" field and stores zip codes of minor geocodes to an "MZIP" in the index in step 905. The "ZIP" and "MZIP" fields are used later for faster searching. A major geocode is more geographically relevant than a minor geocode. The geoindexer 306 stores the major geocode and minor geocode in separate fields to set a higher boost for the major geocode. The title of a web page is the name of web document and is a good representation of the web document. In step 906, the "TITLE" is both indexed and stored, so that title can be searched and displayed. To avoid spamming, the first 100 characters of title are indexed and stored and the later characters are discarded. Each web page contains a GR score calculated by the georanker 304 as explained above. The GR score is also stored and indexed in step 906, so that the GR can be used in later searching. A higher GR value indicates a more popular local web site such as community web site or higher authority local web site such as the chamber of commerce web. In step 907, the "CONTENT" is indexed for the entire content of the web page. Thus the entire content is searchable. Title and content are indexed separately to boost the importance of title. Note that tags of the web page were stripped out as was explained in FIG. 4. Some search engines index the <META> content. Because <META> content is invisible to users, it opens an opportunity for spamming a search engine by creating irrelevant keywords in <META> content tag. Thus this embodiment abandons the usage of <META> content tag. In alternative configurations, the META tag information is also indexed.

In one configuration, a geocode can be associated with a pair of latitude and longitude value. Based on geocodes of a web page, a list of latitude and longitude pairs can be generated. The latitude and longitude are represented as Mercator easting and northing distance. In this example configuration, deriving at least one specific geographic reference from the geocode comprises looking up a zip code corresponding to the at least one specific geographic reference and generating at least one Mercator value corresponding to the specific geographic reference. In this case, indexing and storing a unique document identifier associated with each web page comprises generating the respective unique document identifier for each web page based on a uniform resource locator associated with each web page.

Mercator projection was invented by Gerard Mercator in the $16^{th}$ century. Mercator distances are used to filter out results that are greater than a searching radius. A Mercator value is calculated in the precision of miles since it is for distance filter and the precision in mile is good enough. The calculation of distance based on normal latitude and longitude takes much more time since there is SIN and COS calculation. Duplicate Mercator easting and northing pair values are further eliminated. The pair values are sorted increasingly by easting value first and by northing value second. Finally there will be a list of unique Mercator easting and northing pair values associated with the web page. The Mercator easting and northing pair values are indexed and stored into field "LOC" in step 908.

For example, a web page may contain four geocodes. The first pair has Mercator value (1483, 1117), where 1483 is easting and 1117 is northing. The second pair is (1493, 1107), the third pair is (1505, 1163), and the fourth pair is (1493, 1107). The final Mercator pair values can be represented as string: (1483, 1117)(1493, 1107)(1505, 1163). The string is indexed and stored to "LOC" field. Since the second pair is the same as the fourth pair, the final string contains three pairs of Mercator values.

A barrel for a folder is generated by Geoindexer in step 909. Each folder holds a repository of web page content from a geographical region, which includes data within that region and data in an expanded region that overlaps regions represented by nearby folders. The barrel and zip code lookup table are determined and stored in hard drive in step 910. There is a one to one relationship between a zip code and a barrel. For a given zip code, it can be associated with only one barrel. A barrel contains data within a geographical region and its expanded or overlapping region. Since there is data overlap in the expanded region, all zip codes within the region are associated in the barrel and zip code lookup table. Zip codes in the expanded region are omitted for the table.

The barrels are independent of each other and can be searched separately. One barrel is relevant to a certain geographical area and it is much smaller than the original repository. A smaller barrel can reduce the resource required by searching. Given a zip code, only the geographical related barrel need be searched. Lots of unrelated barrels are not searched. Thus the present invention improves the speed and accuracy of performing a geographical (i.e., a local) search.

Figure 10:
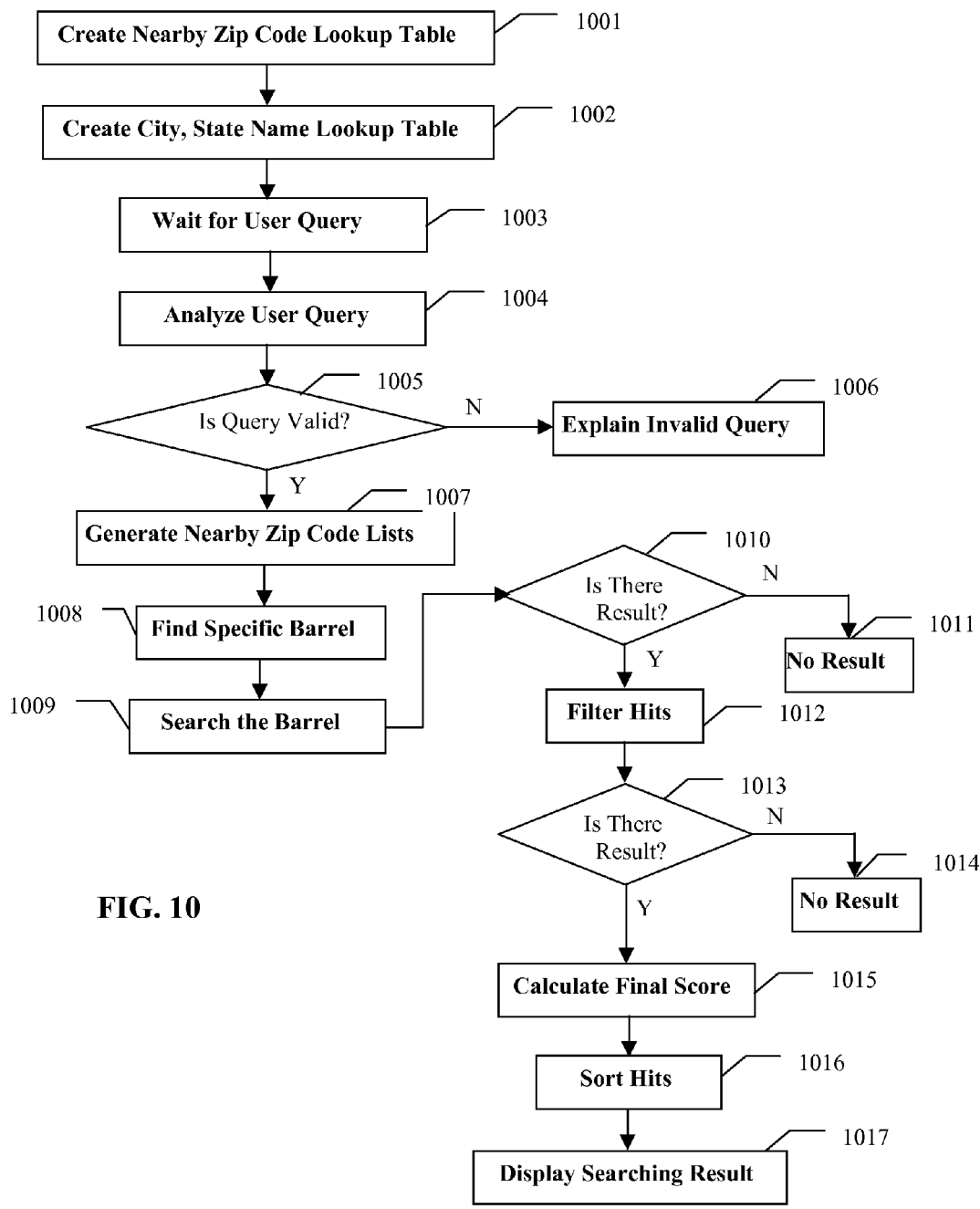
FIG. 10 illustrates a flow chart of a geosearcher in accordance with one embodiment of the invention.

FIG. 10 illustrates a flow chart of a geosearcher 308 in accordance with one example embodiment of the invention. Generally, the geosearcher 308 receives a user query including at least one keyword and a location. The geosearcher 308 uses the location to identify a barrel in which to search content of web pages indexed with that barrel. For all indexed web page content in the searchable content index for that barrel that has a corresponding specific geographic reference within the set of nearby specific geographic references, the geosearcher 308 identifies matching web pages that contain content matching the at least one keyword. The geosearcher 308 uses the location to identify a set of nearby specific geographic references indexed within the barrel that are within a proximity to the location and provides an indication of the identified web pages to a computer system from which the user query was received. In this manner, searching results are provided that are nearby the user specified location. Identifying web pages that contain content matching the keyword can comprise ordering the matching web pages based on the specific geographic reference of each matching web page in relation to proximity to the location received in the user query, or ordering the matching web pages based on the keyword matching scores, or ordering the matching web pages based on the georank of the matched web pages.

The geosearcher 308 thus allows geographical searching of the content of the geocoded web page and the geocodable web page(s) of a web site relative to the geocode by processing a user query that includes a location against the indexed content of the geocoded web page and content of the geocodable web page(s) to identify web pages within a predetermined proximity to the location specified in the user query that contain content matching the user query.

In one configuration, processing a user query that includes a location against the indexed content of the geocoded web page and content of the geocodable web page comprises receiving a user query including at least one keyword and a location and using the location to identify a folder (i.e., an indexed barrel) in which to search content of web pages indexed with that folder. The folder/barrel is selected from a plurality of folders/barrels that each contains location indexed web page content for web pages associated with a specific geographic region. For all indexed web page content in a searchable content index of the folder that has a corresponding specific geographic reference within the set of nearby specific geographic references, the geosearcher 308 identifying matching web pages in that folder that contain content matching the at least one keyword of the user query. The geosearcher 308 then uses the location to identify a set of nearby specific geographic references indexed within the folder/barrel that are within a proximity to the location and provides an indication of the identified web pages to a computer system from which the user query was received.

One goal of geosearcher 308 is to provide high quality local search results efficiently. The geosearcher 308 operates as bridge between the user queries and the indexed barrels. The geosearcher 308 in one configuration is a software component installed on one or more web servers. The web server has a static IP address and a fast Internet link such as T1 line. A user query includes keywords and geographic information. In one embodiment, the browser contains two text boxes: one for keywords and the other for location a shown in FIG. 11. The user supplied geographical location information can be a zip code, or a town name and state name. For example, a valid query could be "Restaurant" for keyword and "Dayton NJ" for geographical location. Another valid query could be "Italian Restaurant" for keyword and "08810" for location. Yet another valid query could be "Chinese Restaurant" for keyword and "Dayton, NJ 08810" as the location. The location may be stored in the computer using a cookie or other technique, so that user does not have to enter the location again at the next visit.

In another embodiment, a user's location can be predetermined and a user is not required to enter location information. For example, certain Wireless Application Protocol (WAP) phones can detect a geographical location of the caller. A user only needs to enter keywords and the location information can be obtained from the WAP phone. In such a configuration, there is just one text box for the keyword and no location text box is needed. With the invention disclosed herein, it is convenient to search a nearby business with a WAP phone.

A search result that matches the user query is called hit. The hit also contains a score indicating the search result quality. The score is measured by the similarity between query terms and a document. The geosearcher 308 is responsible to find hits within a configurable distance from a barrel. The distance can be set to, for example, 50 miles.

The operation of the geosearcher 308 begins in step 1001 at which point a lookup table is generated for each zip code. The look up table contains an array of data records. Each record contains a zip code, the number of nearby zip codes, the zip code's nearby zip codes and distances between the zip code and its nearby zip codes. It can be stored in the following data structure:

```
struct zipPair{
    char zip[6];      //the nearby zip code
    short distance;   //the distance between a zip code and its nearby zip
};
struct zipLookUp{
    char zip[6];      //the zip code
    short num;        //number of nearby zip code within a predefined distance
    zipPair zipNearby[MAX_ZIP_NEARBY];
};
//the zip code look up table that contains nearby locations
zipLookUp zipTable[MAX_ZIP_CODE_NUM];
```

The formula of calculating distance by latitude and longitude is well known. The table can be pre-calculated and stored for later access for distances between zip codes. The lookup table is sorted by zip code in increasing order for faster searching. A binary search is a fast searching algorithm that requires the data source to be in sorted order. During initialization, the lookup table can be read to server memory from a hard drive to avoid slow hard drive disk seeking.

Another lookup table in step 1002 is prepared in memory as well. The lookup table in step 1002 holds all of the town names, state names and zip codes. The lookup table is sorted first by state name, then by town name. The geosearcher 308 awaits a user query in step 1003. Upon receipt of a user query, the geosearcher 308 analyzes the user query to make sure the query is valid in step 1004. A valid query must contain a non-empty keyword and valid location string. An invalid user query may contain either no keyword or no valid location. If the keyword is non-empty, the zip code can be obtained from location string. In step 1004, the zip code is checked with the lookup table made in step 1002 to make sure the input zip code is correct. If there is no zip code inside a location string, the geosearcher 308 can do a binary search in step 1004 from lookup table made in step 1002 to find a corresponding zip code.

The geosearcher 308 checks whether the query is valid in step 1005. If the query is invalid, it displays the explanation for the invalid query and stops further processing in step 1006. An explanation message can be provided to assist the user to re-enter a correct query.

Once a valid query zip code is found, the geosearcher 308 checks the lookup table made in step 1001 and generates a list of nearby zip codes in step 1007. The nearby zip lists for a user's query zip code is a subset of the table made in step 1001. The nearby zip lists are useful for result filtering in later steps as will be explained. By checking the user's query zip with the barrel and zip lookup table (made in step 910), a specific barrel related to the query is assigned in step 1008. For a given zip code, there is a unique barrel to search within. In step 1009, the geosearcher 308 searches keywords against the barrel and returns a number of hits. The geosearcher 308 checks whether there is any hit in step 1010. If there is no hit, it will display "no result" found page in step 1011.

If there is hit, the results may contain hits that are more than a predefined distance RADIUS, such as for example, 50 miles from user supplied query zip code. The local search engine 100 can search results within a certain distance, this may be a user specified distance. These hits can be filtered out in step 1012 to only include those within the predetermined distance.

In one embodiment, the hits are filtered out by comparing the user's location with "LOC" field. The user's location has a Mercator easting and northing value (X, Y). So the range of easting value shall be (X−RADIUS) and (X+RADIUS). The range of a northing value shall be (Y−RADIUS) and (Y+RADIUS). If each pair value of the "LOC" field is out of range, the hit is filtered out. If a pair value (X1, Y1) is within the range, a further calculation is needed. It is determined in one configuration by the following equation:

$$(X1-X)*(X1-X)+(Y1-Y)*(Y1-Y) <= RADIUS*RADIUS \qquad \text{Equation 4}$$

If a pair value of "LOC" can not meet the criteria of the above equation, the hit is filtered out as well. Note that the calculation is very fast since the computation is simple.

In another embodiment, the hit can be filtered out by a lookup table. Each hit has a "ZIP" and "MZIP" field. The filter compares zip codes from "ZIP" and "MZIP" with nearby zip code lists 1007. If all of the zip codes are not inside the list made in step 1007, the hit is filtered out. Otherwise the hit is kept in step 1012. If a zip code from "MZIP" field is inside the table made in step 1007, the geosearcher 308 suppresses the hit result by dividing the hit score by 5. In this manner, the minor geocode ranks lower in searching result.

In step 1013, the geosearcher 308 judges whether there is hit left after the filter. If there is no hit, a "no result" page will be displayed in step 1014.

If there are results left after the filtering, the results are sorted according to ranking. The ranking is important in a search engine to ensure good relevant results are presented first to the user. Relevance is the key to a search engine's success. The method disclosed herein organizes data according to geographical area. Content from web sites in geographical areas unrelated to a user specified location are not searched, thus speeding the search process. Conventional search engine search the entire web and have to rank much more documents, most of which are irrelevant in a local area search. This is another advantage of the present invention compared with a conventional search engine when performing a local area search.

The ranking process of a local search has different characteristics than ranking performed in a general conventional search engine. The search engine 100 disclosed herein filters out the results that are more than a geographical distance first. Then the search engine 100 considers the physical distance factor of remaining results in performing the ranking. The search engine 100 can also consider the link popularity of a web page.

Each hit has a score identified by the geosearcher 308. The score is determined by the occurrence of the query phrase in the searched web document. It depends on how often the phrase appears in web document, whether the title of web document has the phrase, whether several words of a query are close to each other in the web document, and so forth. The hit score indicates the matching rank between a phrase query and a web document.

The GR value of a web document can, in one configuration, also be included in the ranking calculation. Each web document has a GR value calculated by the georanker 304 as explained above. The GR value is a good indication of the quality of a web page. Since the GR value is unrelated to query terms, it helps the ranking result by avoiding query term spamming.

When performing a local area search, distance is also an important factor. People prefer businesses that are closer in distance to their location. The distance can be modeled as a linear function as the following:

$$\text{DistanceFactor} = (\text{RADUIS} - \text{Distance})/\text{RADIUS} \qquad \text{Equation 5}$$

$$\text{Min(DistanceFactor)} = 0.1 \qquad \text{Equation 6}$$

Where DistanceFactor is the distance factor,
RADUIS is the pre-defined distance threshold in search,
Distance is the actual distance between user's query location and the web document's location.

Since Distance is always less or equal than RADIUS (results of distance greater than RADIUS are filtered out), the maximum of DistanceFactor is 1. The minimal DistanceFactor is set to 0.1 so that the distance factor is normalized. That means, if DistanceFactor is less than 0.1 by equation, it is set as 0.1.

The final ranking score is calculated in step 1015. Things such as phrase query terms, the link popularity of a web page, and distance are all important factors when performing a local area search. The most relevant local search results are a web document that has a high score in phrase query, a high popular web site and is close to user's query location. The final ranking score is determined by the following equation in one configuration:

$$\text{FinalScore} = \text{SearchScore} * \text{GR} * \text{DistanceFactor} \qquad \text{Equation 7}$$

Where FinalScore is the final ranking score for the query,
SearchScore is the score returned by Geosearcher,
GR is the georank score of the web page,
DistanceFactor is the distance factor.

In step 1016, all hits are sorted by the final ranking scores. The ratio between maximum and minimal GR is 10. And the ratio between maximum and minimal DistanceFactor is 10 as well. Thus, not a single factor can be dominated in the final ranking score calculation. In one configuration, each hit contains the title, URL, geocode, summary text for keyword, etc. The title can be retrieved from "TITLE" field, URL is obtained from "URL" field", geocode can be retrieved from "GEOCODE" or "MGEOCODE" by comparing this with the query zip code. A summary text contains the search result string and the query keywords are highlighted. The hits are organized as HTML format and sent to user's web browser in step 1017 and the search engine 100 has finished the query.

Accordingly, in one configuration, using the location to identify a set of nearby specific geographic references indexed within the folder that are within a proximity to the location comprises identifying a Mercator value of the zip code from the location in the user query and generating the maximum and minimal Mercator values for the query. Then the geosearcher 308 identifies Mercator values of matching web pages in the folder that contain content matching the user supplied keyword. Then the geosearcher 308 filters out the matching web pages that are out of range based on the Mercator values of the zip code and of the matching web pages in the folder that contain content matching the at least one keyword.

In one configuration, using the location to identify a set of nearby specific geographic references indexed within the folder that are within a proximity to the location comprises identifying a zip code associated with the location received in the user query. Then the geosearcher 308 identifies a list of nearby zip codes within a predetermined proximity to the zip code associated with the location received in the user query. Identifying matching web pages that contain content matching the keyword then comprises identifying matches between the keyword and indexed content of web pages for which the geocode of each matching web page corresponds to a zip code within the list of nearby zip codes within a predetermined proximity to the zip code associated with the location received in the user query.

In one embodiment, the user may choose to view search results that are a different distance from the user location. For instance, the user may select to see results within 5 miles, 10 miles, 30 miles, or 50 miles of the user specified location. The RADIUS parameter is changed accordingly to accomplish this and is used in the above calculations. Thus the searching results can be determined by the distance setting.

Figure 11:
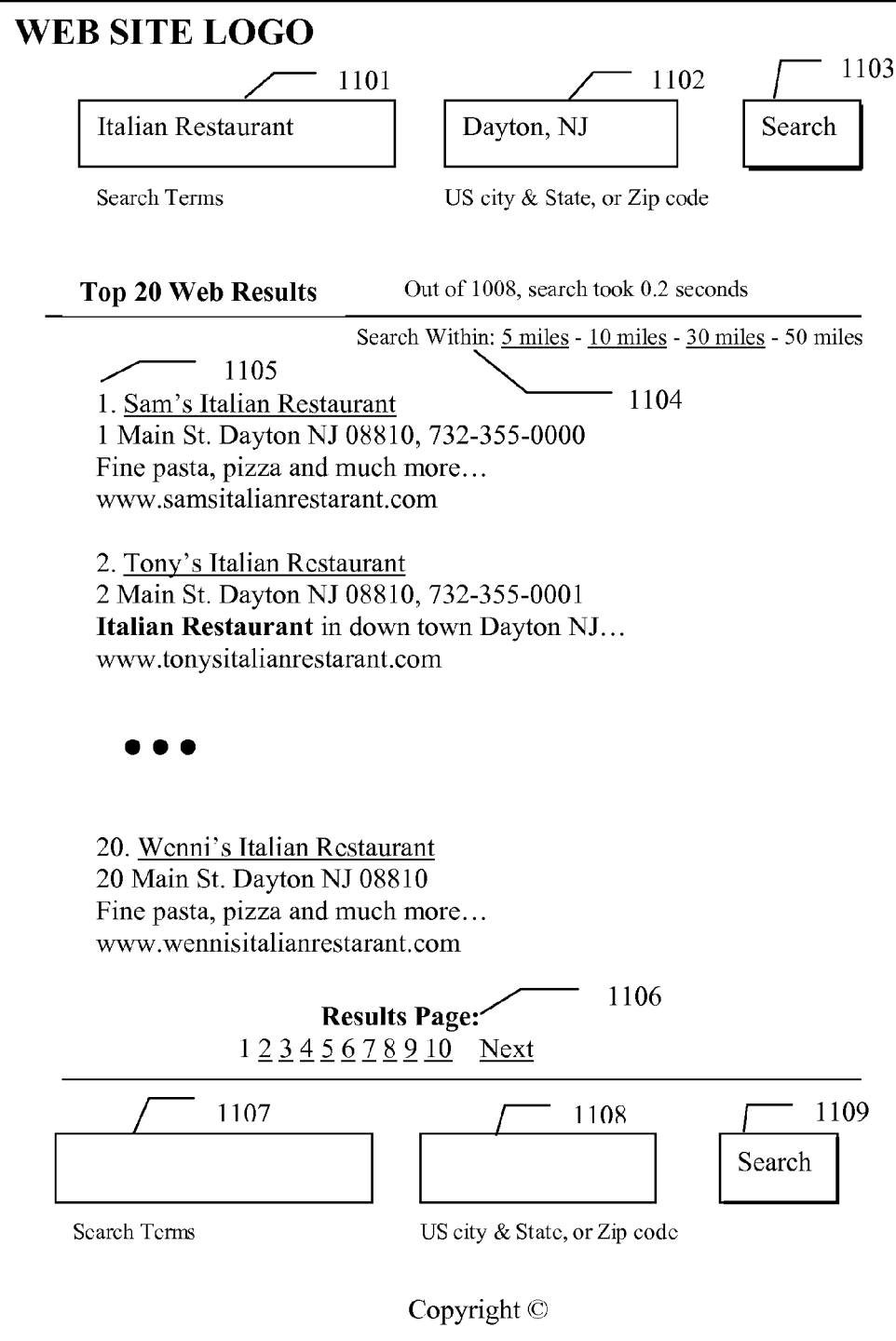
FIG. 11 illustrates a result web page generated by geosearcher in accordance with one embodiment of the invention.

FIG. 11 illustrates an example resultant web page generated by Geosearcher 308 in response to a user query. The web page consists of query and search results. There are two text boxes 1101 and 1102. Text box 1101 is for the query term input and text box 1102 is used for location input. The query term "Italian Restaurant" is entered in 1101 and "Dayton NJ" is entered in 1102. The user then clicks the search button 1103. The search distance is configurable by clicking distance settings 1104. The top search result 1105 is displayed in the middle of the page. Each search result includes a title in the first line, the address and possible telephone number in the second line, the summary in the third paragraph, and URL in the last line. The title of a search result is a hyperlink that can lead to the actual web site. A user can click the various page links 1106 to see more results. In the bottom of the page, there are two empty text boxes 1107 and 1108. 1107 is the query term box and 1108 is the location input box for another search. The search button 1109 is listed to the right of 1108. The user interface is simple and intuitive to use but is shown here by way of example only and it is to be understood that this page format is not limiting of the invention.

Figure 12:
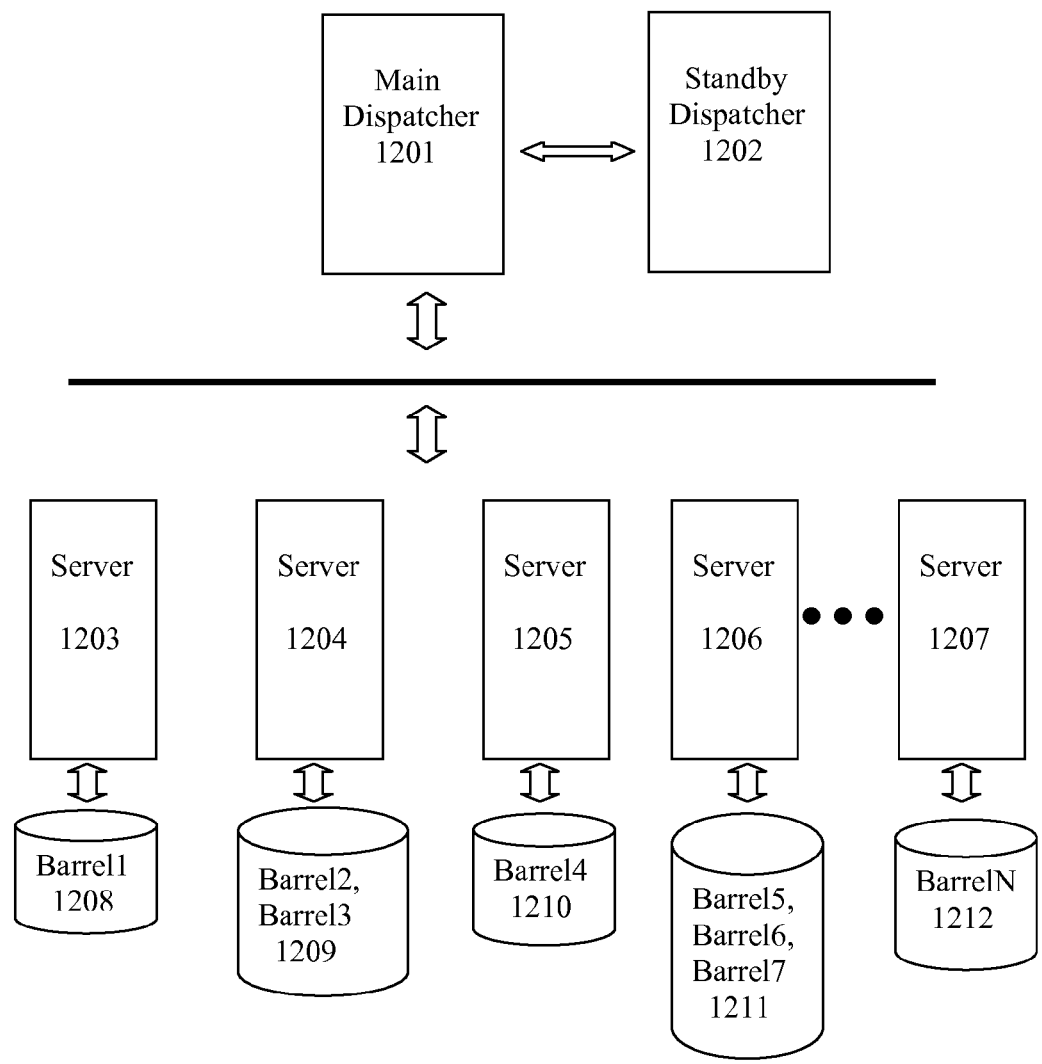
FIG. 12 illustrates a diagram of distributed geosearchers in accordance with one embodiment of the invention.

FIG. 12 illustrates a diagram of distributed geosearchers 308 in accordance with one example configuration of the invention. Distributed geosearchers 308 are utilized to make searching faster. In one configuration, a main dispatcher computer in a cluster of computers performs receiving a user query. Other computers in the cluster are each assigned a portion of folders containing geographically indexed content of web pages and a portion of the index associated with those folders containing the geographically indexed content. The main dispatcher computer forwards the user query to a computer in the cluster that is responsible for searching the geographic region associated with the location specified in the user query.

Some conventional search engines contain thousands of servers for searching. Even though the traditional search engine answers a query well, they generate poor results for local area searches. Since the full repository is so big, it is very complex to organize, distribute and maintain the repository to thousands of severs in such conventional systems. In the invention disclosed herein, each barrel is an independent index, which can be loaded to a single computer. This makes the distributed computing much easier. A dispatcher 1201 listens to user query and analyzes the zip code from the user query. The dispatcher stores the linked servers' configuration in memory so that it knows how to direct traffic based on the zip code. Another dispatcher 1202 can operate in stand by, so that when dispatcher 1201 fails, it can serve as the main dispatcher. According to query's zip code, a dispatcher will direct traffic to a specific server 1203, 1204, 1205, 1206, or 1207 in this example. The dispatchers and servers are located in a data center that has high speed network connection. Each server runs a geosearcher 308. One or more barrels 307 can be stored in a server's hard drive. The number of barrels 307 in a server is determined based on searching speed and user traffic volume. For instance, server 1203 may contain one barrel 1208 that has a high traffic load while another server 1206 may contain several barrels 1211 that have light user query loads. The hardware configuration of each server can be identical or different. If a server fails, one server can operate as a back up to another one.

In the foregoing specification, the invention has been described with reference to specific embodiments thereof. It is clear to one skilled in the art that the above embodiments may be altered in many ways without departing from the scope of the invention.

What is claimed is:

1. A system comprising:
    a network interface to receive a domain name associated with a domain on the Internet;
    a web crawler retrieving a first page based on a first address, the first address at least in part specifying the domain on the Internet from which to retrieve the first page;
        wherein retrieving the first page includes:
    retrieving, based on the first address, the first page from the Internet;
    detecting that the first page includes a link to a second page;
    retrieving the second page based on a second address, the second address at least in part specifying the domain on the Internet;
        wherein retrieving the second page includes utilizing the link to retrieve the second page from a server over a network and detecting geographical information associated with the second page;
        wherein detecting the geographical information includes detecting presence of the geographical information in the second page based on analyzing contents of the second page retrieved from the server; and
    a processor to associate the geographical information in the second page to the first page to create an index.

2. The system in claim 1, further comprising a search interface receiving a search request from a requestor, the search request including a request for web page addresses of entities located in a particular physical geographical location as specified by the search request;

identifying that the particular physical geographical location in the search request and the geographical information associated with the second page specify a same geographical location;
utilizing the index to generate search results that satisfy the search request; and
generating the search results to include the first address for retrieval of the first page.

3. The system of claim 2, wherein the search interface allows geographical searching of the content of the web pages by processing a user query that includes a location against the indexed content of the web pages to identify web pages within a predetermined proximity to the location specified in the user query that contain content matching the user query.

4. The system of claim 3, wherein the user query includes at least one keyword and the search interface identifies matching web pages in that folder that contain content matching the at least one keyword of the user query; uses the location to identify a set of nearby specific geographic references indexed within the folder that are within a proximity to the location; and provides an indication of the identified web pages to a computer system from which the user query was received.

5. The system of claim 2, wherein the search interface includes a main dispatcher computer in a cluster of computers, the other computers in the cluster each being assigned a portion of folders containing geographically indexed content of web pages and a portion of the index associated with those folders containing the geographically indexed content; the main dispatcher computer forwarding the user query to a computer in the cluster that is responsible for searching the geographic region associated with the location specified in the user query.

6. The system in claim 1, wherein the first address and second address are uniform resource locators, and wherein each of the first address and second address include a common domain name specifying the domain name.

7. The system in claim 1, wherein the web crawler detects the geographical information by analyzing contents of the second page to identify the geographical information; and in response to identifying that the geographical information includes a street address, considers the geographical information to be a valid physical address location of an entity associated with the second page.

8. The system in claim 1, wherein the web crawler further detects geographical information associated with the first page, utilizes the geographical information associated with the second page as a location index for both the first page and the second page, and utilizes the geographical information associated with the first page as a location index for only the first page.

9. The system in claim 8, wherein the processor creates a set of folders;
designates a first folder in the set to track web pages associated with entities physically located in a first geographical region;
designates a second folder in the set to track web pages associated with entities physically located in a second geographical region, the first geographical region at least partially overlapping with the second geographical region; and
in response to detecting that a given page is associated with a particular entity physically located within both the first geographical region and the second geographical region:
initiating storage of reference information in the first folder, the reference information in the first folder specifying the given page, inclusion of the reference information in the first folder indicating that an entity associated with the given page resides within the first geographical region; and
initiates storage of reference information in the second folder, the reference information in the second folder specifying the given page, inclusion of the reference information in the second folder indicating that the entity associated with the given page resides within the second geographical region.

10. The system in claim 1, wherein the processor designates a first repository to track web pages associated with entities physically located in a first geographical region, the first repository including references to page A and page B;
designates a second repository to track web pages associated with entities physically located in a second geographical region, the second repository including a reference to page C;
in response to detecting that page A includes a link to page B, performs a link analysis to rank page A and page B in the first repository; and
in response to detecting that page C includes a link to page B, prevents a link analysis because page C and page B do not represent entities residing in a same geographical region.

11. The system in claim 1, wherein the processor derives a rank for the first page depending on a number of other pages including a link to the first page; and utilizes the rank for the first page and rankings of other pages associated with the physical location to identify a position to display a reference to the first page in corresponding search results.

12. The system in claim 1 wherein the web crawler traverses links originating from a seed web page to identify new web pages of a web site, the web pages of the web site including a geocoded web page and the at least one geocodable web page; and strips the content of web pages of the web site to a format containing only text content.

13. The system of claim 12 wherein the web crawler, for at least one web page within the web site, identifies that at least one web page as the geocoded web page if the text content of that web page contains at least one of: i) a geocode in a complete form within the text content of the web page; and ii) at least a portion of the geocode within the text content of the identified web page, and if at least a portion of the geocode within the text content of the identified web page is present, performing a secondary lookup operation to identify remaining content of the geocode; and associating the geocode of the geocoded web page to the content of the geocoded web page.

14. The system of claim 12 wherein the geocode of the geocoded web page is a major geocode and wherein the web crawler further identifies a web page of the web site containing addressing information indicating a minor geocode, wherein the minor geocode is a geocode other than the major geocode; the web crawler further associates the major geocode to the web page of the web site containing a minor geocode; and associates the minor geocode only to the web page of the web site containing addressing information indicating a minor geocode allowing the search of the web page via major and minor geocodes.

15. The system of claim 12 wherein: the geocoded web page is at least one of: i) a home page of the web site; ii) a contact page of the web site; iii) a direction page of the web site; iv) an about page of the web site; v) a help page of the web site; and vi) a page of the web site that is no deeper than a predetermined number of links below the home page of the web site; and wherein the geocode contains a complete physical address of the entity associated with the web site.

* * * * *